(12) United States Patent
Skowron et al.

(10) Patent No.: US 9,182,923 B2
(45) Date of Patent: Nov. 10, 2015

(54) CONTROLLING THROUGHPUT OF PROCESSING UNITS ASSOCIATED WITH DIFFERENT LOAD TYPES IN STORAGE SYSTEM

(75) Inventors: Piotr Skowron, Warsaw (PL); Marek Biskup, Warsaw (PL); Lukasz Heldt, Warsaw (PL); Cezary Dubnicki, Warsaw (PL)

(73) Assignee: NEC CORPORATION, Tokyo (JP)

( * ) Notice: Subject to any disclaimer, the term of this patent is extended or adjusted under 35 U.S.C. 154(b) by 508 days.

(21) Appl. No.: 13/639,344

(22) PCT Filed: Aug. 25, 2011

(86) PCT No.: PCT/JP2011/004719
§ 371 (c)(1),
(2), (4) Date: Oct. 4, 2012

(87) PCT Pub. No.: WO2012/029259
PCT Pub. Date: Mar. 8, 2012

(65) Prior Publication Data
US 2013/0031563 A1    Jan. 31, 2013

Related U.S. Application Data

(60) Provisional application No. 61/378,739, filed on Aug. 31, 2010.

(51) Int. Cl.
G06F 9/46 (2006.01)
G06F 3/06 (2006.01)

(52) U.S. Cl.
CPC .............. *G06F 3/0653* (2013.01); *G06F 3/061* (2013.01); *G06F 3/0605* (2013.01);
(Continued)

(58) Field of Classification Search
CPC ..... G06F 3/061; G06F 3/0629; G06F 3/0631; G06F 3/0653
See application file for complete search history.

(56) References Cited

U.S. PATENT DOCUMENTS 6,434,631 B1* 8/2002 Bruno et al. ................... 710/6
2005/0193168 A1* 9/2005 Eguchi et al. ............... 711/114
(Continued)

FOREIGN PATENT DOCUMENTS

CN    1333505 A    1/2002
EP    1 580 654 A2    9/2005
(Continued)

OTHER PUBLICATIONS

Office Action dated Aug. 27, 2013 issued by the Japanese Patent Office in counterpart Japanese Patent Application No. 2012-528163.
(Continued)

*Primary Examiner* — Meng An
*Assistant Examiner* — James J Lee
(74) *Attorney, Agent, or Firm* — Sughrue Mion, PLLC

(57) ABSTRACT

The storage system includes a progress status detection unit that detects respective progress statuses representing proportions of the amounts of processing performed by respective processing units to the amount of processing performed by the entire storage system, each of the processing units being implemented in the storage system and performing a predetermined task; a target value setting unit that sets target values of processing states of the processing units, based on the detected progress statuses of the respective processing units and ideal values of the progress statuses which are preset for the respective processing units; and a processing operation controlling unit that controls the processing states of the processing units such that the processing states of the processing units meet the set target values.

8 Claims, 18 Drawing Sheets

(52) U.S. Cl.
CPC ........... *G06F 3/0629* (2013.01); *G06F 3/0631* (2013.01); *G06F 3/0632* (2013.01); *G06F 3/0683* (2013.01); *G06F 2211/1088* (2013.01)

(56) References Cited

U.S. PATENT DOCUMENTS

| | | | |
|---|---|---|---|
| 2005/0216663 A1 | 9/2005 | Fujibayashi | |
| 2006/0090163 A1* | 4/2006 | Karlsson et al. | 718/105 |
| 2006/0161756 A1* | 7/2006 | Yagisawa et al. | 711/171 |
| 2007/0220028 A1 | 9/2007 | Hikawa et al. | |
| 2009/0089458 A1* | 4/2009 | Sugimoto et al. | 710/6 |
| 2010/0058009 A1* | 3/2010 | Fujibayashi | 711/161 |
| 2010/0174923 A1 | 7/2010 | Houlihan et al. | |
| 2010/0228898 A1 | 9/2010 | Aranguren et al. | |
| 2010/0312992 A1 | 12/2010 | Wakabayashi et al. | |
| 2011/0296212 A1* | 12/2011 | Elnozahy et al. | 713/320 |

FOREIGN PATENT DOCUMENTS

| | | |
|---|---|---|
| JP | 9-160889 A | 6/1997 |
| JP | 2005-275829 A | 10/2005 |

OTHER PUBLICATIONS

Ajay Gulati et al., "PARDA: Proportional Allocation of Resources for Distributed Storage Access", 7th USENIX Conference on File and Storage Technologies, 2009, pp. 85-98.

Chenyang Lu et al., "Aqueduct: online data migration with performance guarantees", Conference on File and Storage Technologies, 2002, pp. 219-230.

Cezary Dubnicki et al., "HYDRAstor: a Scalable Secondary Storage", 7th USENIX Conference on File and Storage Technologies, 2009, pp. 197-210.

International Search Report for PCT/JP2011/004719 dated Nov. 22, 2011.

Extended European Search Report, dated Apr. 2, 2014, issued by the European Patent Office, in counterpart Application No. 11821283.6.

Communication dated Dec. 17, 2014 from the State Intellectual Property Office of the People's Republic of China in counterpart application 201180041775.8.

Communication dated Apr. 23, 2015 from the Canadian Intellectual Property Office in counterpart application No. 2,808,367.

* cited by examiner

Fig. 1

| load type | progress share |
|---|---|
| loadType1 | 50% |
| loadType2 | 30% |
| loadType3 | 20% |

Fig. 4

Input: *policyShares* – map of desired shares per load type,
*infos* – information collected from ACMs
Output: *decisions* – a map of decision per load type. Decision can be INCREASE, DECREASE or NO_CHANGE 1  *decisions* ← NO_CHANGE;
2  *someoneWasIncreased* ← false;
3  *someoneHasWork* ← false;

4  foreach *load* in *infos* do
5      *currentShares[load]* ← $\frac{load.throughput}{totalThroughput}$ ;

6  foreach *load* in *infos* do
7      if *load.hasWaitingWork* = true then
8         *someoneHasWork* ← true 9  // Recount target shares
10 *targetShares* ← recountDesiredShares( *policyShares, currentShares, infos*) ;
11 // Try to increase limits
12 foreach *load* in *infos* do
13     if *(load.hasWaitingWork* = true*)* and *(load.limitAchieved* = true*)* and *(currentShares[load]* ≤ *targetShares[load])* then
14        *decisions*[load] ← INCREASE;
15        *someoneWasIncreased* ← true 16 // Try to decrease limits - only if no limit was increased
17 if *(*not *someoneWasIncreased)* and *someoneHasWork* then
18     foreach *load* in *infos* do
19        if *(currentShares[load]* ≥ *targetShares[load])* then
20           *decisions[load]* ← DECREASE;

21 // Pass decisions to the controllers
22 foreach *load* in *infos* do
23     *controller[load].pass(decisions[load], currentShares[load], targetShares[load], load.limit)*;

Fig. 5

Input: *decision, currentShare, targetShare, oldLimit*
Output: *newLimit* – the new value of the limit that will be sent to the corresponding ACM 1 Constants: *minLimit*, $\alpha$ 2 *factor* $\leftarrow$ $|targetShare - currentShare| \times \alpha$ ;

3 if *decision = INCREASE* then

4     *newLimit* $\leftarrow$ *oldLimit* + *factor* $\times$ *oldLimit* ;

5 if *decision = DECREASE* then

6     *newLimit* $\leftarrow$ *oldLimit* − *factor* $\times$ *oldLimit* ;

7 return *newLimit*;

Fig. 6

| | Critical reconstruction | Critical Garbage collection | Normal reconstruction | Garbage collection | Data defragmentation | No bg. tasks |
|---|---|---|---|---|---|---|
| user load | 20% | 20% | 50% | 50% | 70% | 85% |
| garbage collection | 10% | 35% | 30% | 30% | 30% | 15% |
| background | 70% | 35% | 20% | 20% | 0% | 0% |

CONTROLLING THROUGHPUT OF PROCESSING UNITS ASSOCIATED WITH DIFFERENT LOAD TYPES IN STORAGE SYSTEM

CROSS REFERENCE TO RELATED APPLICATIONS

This application is a National Stage of International Application No. PCT/JP2011/004719 filed Aug. 25, 2011, claiming priority based on U.S. Provisional Application No. 61/378,739 filed Aug. 31, 2010, the contents of all of which are incorporated herein by reference in their entirety.

TECHNICAL FIELD

The present invention relates to a storage system, and in particular, to a storage system for performing a plurality of tasks.

BACKGROUND ART

In parallel to read/write operations (user load), storage systems often execute multiple types of background tasks, such as reconstruction of parity data, defragmentation, and garbage collection. The priority of tasks usually depends on the state of the system. In a typical case, user load has the highest priority in order to achieve the desired quality of service. When a failure occurs, the missing parity data must be reconstructed with high priority (RAID rebuilding is an example of such reconstruction) in order to recover the expected resiliency level, that is the number of failures that can be tolerated without data loss. The priority of such reconstruction may depend on the current resiliency level. In a system running out of space, writes should be slowed down and the released resources should be assigned to garbage collection. Even in a healthy system, maintenance tasks, such as garbage collection and defragmentation, should not be starved regardless of their lower priority.

Here, the following notation is used below: load type (hereinafter load) denotes a class of tasks of similar characteristic, for example, writes and background tasks; load source (hereinafter source) denotes a part of the system that produces tasks of a certain load type. Load sources are, for instance, software components admitting write/read operations or performing background tasks.

The priorities of loads have to be enforced by some mechanism that divides resources between them according to a given policy (NPL 1, 2). The mechanism should also ensure that the system works with the highest performance possible, and that lower priority loads proceed faster if higher priority loads do not utilize their share.

CITATION LIST

Non Patent Literature

NPL 1: GULATI, A., AHMAD, I., AND WALDSPURGER, C. A. PARDA: Proportional Allocation of Resources for Distributed Storage Access. In 7th USENIX Conference on File and Storage Technologies (San Francisco, Calif., USA, February 2009).
NPL 2: LU, C., ALVAREZ, G. A., AND WILKES, J. Aqueduct: Online data migration with performance guarantees. In FAST '02: Proceedings of the 1st USENIX Conference on File and Storage Technologies (Berkeley, Calif., USA, 2002), USENIX Association, p. 21.
NPL 3: DUBNICKI, C., GRYZ, L., HELDT, L., KACZMARCZYK, M., KILIAN, W., STRZELCZAK, P., SZCZEPKOWSKI, J., UNGUREANU, C., AND WELNICKI, M. HYDRAstor: a Scalable Secondary Storage. In 7th USENIX Conference on File and Storage Technologies (San Francisco, Calif., USA, February 2009).

SUMMARY OF INVENTION

Technical Problem

Designing a mechanism for controlling resources in a distributed storage system is a challenging task because of complicated system's architecture, inherent heterogeneity, and unpredictability of loads. For a complex system, it is rarely possible to define a satisfactory model that predicts the kind and the amount of resources used by a particular load. Simple solutions, such as static allocation of resources to loads, are not practical because loads often change their resource needs dynamically. Additionally, external processes on the same servers make the total amount of resources available for the load in the system vary in time.

The complexity of the problem is also caused by the highly variable characteristic of both user writes and background tasks. User writes may require bounded latency, but single block-write duration usually cannot be estimated because of deduplication, caching, and workload fluctuations. Since only limited memory is available for prefetching, user reads require even lower latency in order to achieve high performance.

As such, an exemplary object of the present invention is to efficiently utilize resources in a storage system to improve the system performance, which is the problem to be solved as described above.

Solution to Problem

According to an aspect of the present invention, a storage system includes a progress status detection unit that detects respective progress statuses representing proportions of the amounts of processing performed by respective processing units to the amount of processing performed by the entire storage system, each of the respective processing units being implemented in the storage system and performing a predetermined task; a target value setting unit that sets target values of processing states of the respective processing units, based on the detected progress statuses of the respective processing units and ideal values of the progress statuses which are preset for the respective processing units; and a processing operation controlling unit that controls the processing states of the respective processing units such that the processing states of the respective processing units meet the set target values.

According to another aspect of the present invention, a computer program including instructions for causing an information processing device, including respective processing units that perform predetermined tasks respectively, is a program to realize a progress status detection unit that detects respective progress statuses representing proportions of the amounts of processing performed by the respective processing units to the amount of processing performed by the entire information processing device; a target value setting unit that sets target values of processing states of the respective processing units, based on the detected progress statuses of the respective processing units and ideal values of the progress statuses which are preset for the respective processing units; and a processing operation controlling unit that controls the processing states of the respective processing units such that the processing states of the respective processing units meet the set target values.

According to another aspect of the present invention, an information processing method includes detecting respective progress statuses representing proportions of the amounts of processing performed by respective processing units to the amount of processing performed by an entire storage system, each of the respective processing units being implemented in the storage system and performing a predetermined task; setting target values of processing states of the respective processing units, based on the detected progress statuses of the respective processing units and ideal values of the progress statuses which are preset for the respective processing units; and controlling the processing states of the respective processing units such that the processing states of the respective processing units meet the set target values.

Advantageous Effects of Invention

As the present invention is configured as described above, it is possible to efficiently utilize resources to improve the performance of the storage system.

BRIEF DESCRIPTION OF DRAWINGS

FIG. 1 is a table showing an exemplary policy of progress shares of a first exemplary embodiment;

FIG. 4 shows Algorithm 1 of the first exemplary embodiment;

FIG. 5 shows Algorithm 2 of the first exemplary embodiment;

FIG. 6 is a table showing exemplary policies of progress shares of the first exemplary embodiment;

DESCRIPTION OF EMBODIMENTS

<First Exemplary Embodiment>

Figure 2:
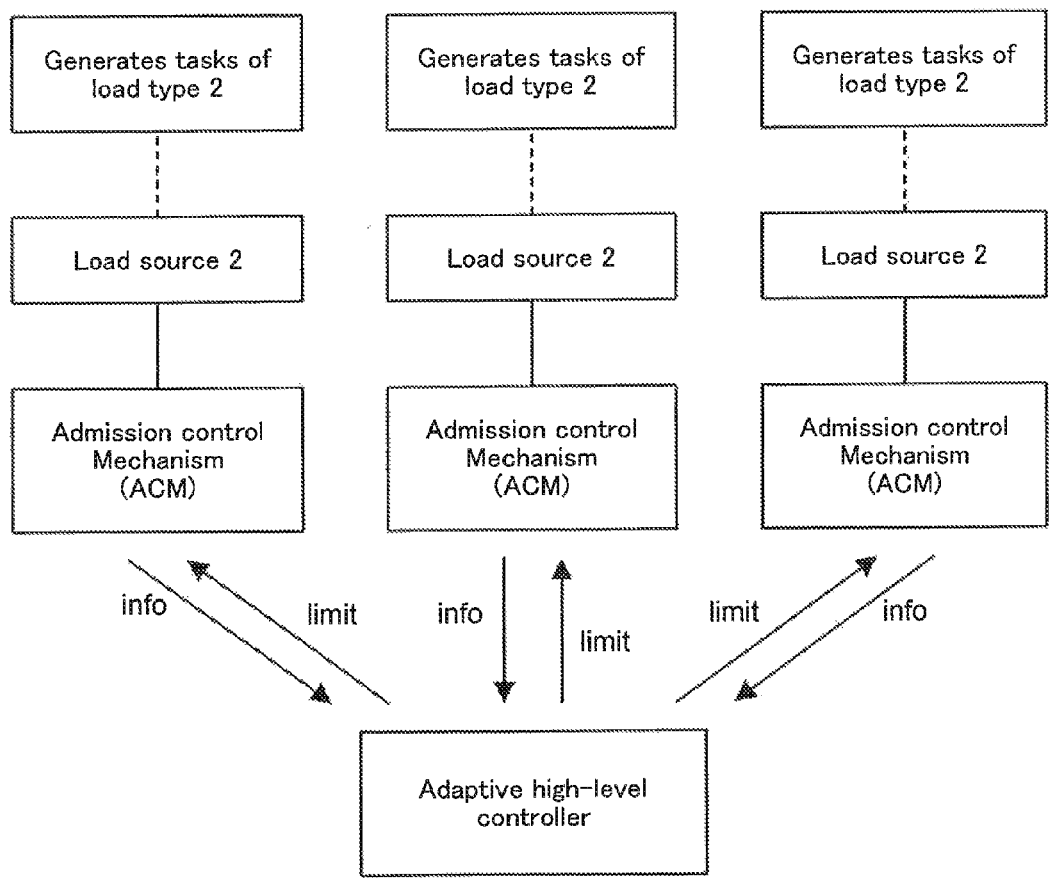
FIG. 2 is an explanation view showing an aspect of resource management of the first exemplary embodiment.
Figure 3:
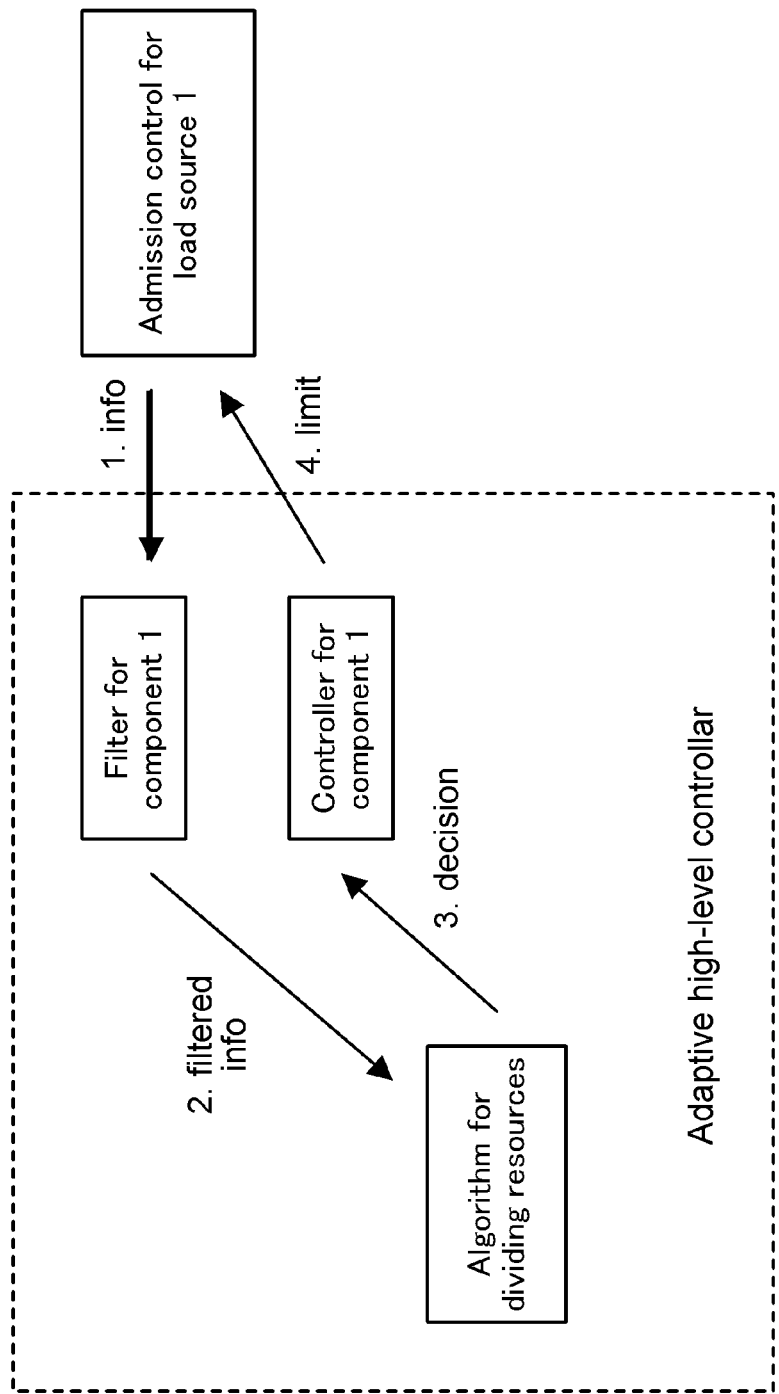
FIG. 3 is an explanation view showing the architecture of resource management of the first exemplary embodiment.

The present invention provides a mechanism of dynamic resource division between heterogeneous loads while ensuring high resource utilization in the system. The presented approach is based on an abstraction of the loads and avoids assumptions about resources that they use and about the process of handling certain types of load. In particular, loads may be handled by multiple objects of different type, each competing for the same resources.

The method provided in the present invention ensures proportional progress of loads rather than proportional division of the resources used by these loads. From the user perspective, such approach is preferable, as users are interested in effects and advancement of the loads rather than in internal implementation details, such as resource consumption. Such an approach is also preferable from the system point of view, as precise resource allocation and accounting is problematic for complex systems, in particular for distributed ones. As such, in the present invention, we extended it to heterogeneous loads that include background tasks.

In order to control the advancement of heterogeneous loads, we require that each load has a progress indicator that can be compared to the progress of other loads. As most tasks work on data, such indicator can be chosen as the throughput generated by tasks related to this load, that is, the total amount of processed data divided by the time elapsed. For example, the throughput of write request is the amount of data saved to disk per second. For tasks that do not operate on any data, one can take some artificial value of throughput that estimates the progress made by this task.

Tasks having the same throughput may introduce a different burden on the system. Some tasks are much heavier than others, i.e. they achieve much lower progress given the same amount of resources. In order to achieve high progress, they must consume significant amount of resources, slowing down or even blocking the execution of other tasks. To reduce such influence, the throughput of such tasks can be artificially scaled by arbitrary weights. From now on, by the throughput of a load we understand the throughput multiplied by its load-type related weight. We also assume that the progress is measured by the throughput, even though other metrics are possible.

The core algorithm divides resources between loads according to a given policy. A policy specifies progress shares, that is, the proportion in which the total throughput of the system should be divided between existing loads. The policy may dynamically change depending on the state of the system.

EXAMPLE 1

An example of a progress policy is given in FIG. 1. With these progress shares the objective is to achieve such throughput of the loads that would satisfy the following Math. 1. As such, the goal is to ensure that throughput generated by each load type is proportional to the progress share.

$$\frac{t_{load}\text{Type}_1}{t_{total}} = 50\%$$ [Math. 1]

$$\frac{t_{load}\text{Type}_2}{t_{total}} = 30\%$$

$$\frac{t_{load}\text{Type}_3}{t_{total}} = 20\%$$

$$t_{total} = t_{load}\text{Type}_1 + t_{load}\text{Type}_2 + t_{load}\text{Type}_3$$

As indicated above, the mechanism of controlling progresses of loads maintains maximal resources utilization in the system. If a load is not able to consume its progress allocation (e.g. application writing to the system has low throughput or there is no need for performing maintenance tasks), the other types are allowed to progress faster so that all the resources in the system are utilized.

EXAMPLE 2

Consider the progress policy of FIG. 1. If loadType$_1$ is able to consume only 25% of the overall progress, the remaining 25% will be allocated to loadType$_2$ and loadType$_3$ proportionally to the policy. As a result, loadType$_2$ will be given 45% (30%+15%) and loadType$_3$ will be given 30% (20%+10%).

It is important to provide satisfactory reaction time to changing conditions, because resource consumption of particular loads and resource availability constantly fluctuate. The major cause for these fluctuations is changes in the policy and loads over time. Additionally, processes working outside of the controlled system influence the availability of the resources for the system loads.

The high-level structure of the resource division mechanism is presented in FIG. 2. Every load source has its own admission control mechanism (ACM) that controls the speed of its work through an exposed limit variable. The value of the limit ("target value" in the second exemplary embodiment) influences the throughput generated by the source; increases and decreases of the limit must induce similar changes in the throughput. The limit may be, for example, an upper bound on the throughput of the loads, or the limitation for the number of concurrently executed tasks of particular load type.

The algorithm periodically measures the throughput of each load and adjusts the current values of their limits in order to achieve proportions of throughputs as in the progress policy.

The present application is organized as follows. First, a novel algorithm according to the present invention will be described. Then, the detailed discussion of the elements of the algorithm will be presented. Then, the concrete problem of scheduling tasks in an enterprise storage system, HYDRAstor (NPL 3), and the implementation of the present solution in this system will be described. Then, the results of experiments conducted on HYDRAstor will be shown, proving main properties of the solution. Then, related work in comparison to our approach will be described, and finally our conclusions will be presented.

(Resource Management Mechanism)

Here, description will be given for the structure of the resource management mechanism and the core algorithm that controls different load types maintaining their throughputs at proportions specified in the policy.

(Architecture)

The mechanism of resource management consists of the following parts (see FIG. 2):

1. Admission Control Mechanism—a software unit associated with every load type, controlling the speed of work of the source through a limit variable. A higher value for the limit means the corresponding load source is allowed to work faster, as described above. For its load, an ACM also gathers information (info) that includes the throughput of the source and indication if there are any tasks waiting in the source for execution. The ACM's info is described in detail later.

2. Filter—responsible for smoothing information received from the ACM in order to eliminate fluctuations of values like throughput. A simple filter may use averaging over a pre-defined period of time.

3. Algorithm—makes for each load type a decision to increase, decrease, or keep the limit unchanged using filtered information from all ACMs describing the current state of the load sources as described above.

4. Controller—given a decision of the algorithm, it calculates the exact values of the limit for its ACM.

The algorithm periodically (every 10 seconds in the present invention; the period is a consequence of the length of the longest unbreakable tasks) collects infos from all the ACMs, makes decisions, and forwards them to the proper controllers. The controllers calculate new values of the limits and pass them to the ACMs.

In every cycle, the limits ("target values" in the second embodiment) are corrected to make the actual division of the progresses ("progress status" in the second embodiment) closer to the desired one (as indicated by the progress policy). There is a trade-off between the speed of the convergence of the progress division to the division from the progress policy and the stability of the system.

(Saturation Detection)

To increase the speed of work of a certain load source, the algorithm increases the limit for its ACM. It will not be able, however, to increase performance of its load type beyond a certain level because the server that handles tasks has limited resources.

EXAMPLE 3

Let the limit for an ACM be defined as an upper bound for the throughput. Consider a server that is able to process T bytes per second. Therefore, even if the ACM is given a limit higher than T, the corresponding load source will be working with speed T. If an external process is working on the server, or if the server is also handling other load, the system will be able to handle even fewer tasks (let us say "t" bytes per second; t<T). In such situation, load source will be working with speed no higher than t, regardless of the higher limit value.

EXAMPLE 4

Let the limit be defined as an upper limitation for the number of concurrently executed tasks. A server is potentially able to accept any number of concurrent tasks, but increasing the limit above a certain value will not increase the throughput; it may even decrease the throughput due to paging or frequent context switching. Let "n" be the lowest limit that gives the highest possible throughput. Increasing the limit above n will have no impact on the real throughput. The value n is not constant but it depends on other tasks being executed concurrently in the system.

In both examples, 3 and 4, we can introduce additional constraints that do not decrease the throughput and improve other properties of the load (e.g latency, memory consumption). In Example 3, we can introduce the limitation for the amount of data currently processed by the system. Such constraint will eliminate thrashing and decrease memory consumption while not affecting the performance. In Example 4, we can control the number of concurrent tasks, n, in a way that their latency is kept below some predefined constant value L. If the ACM is given a limit N higher than n, the source will still use n (to satisfy to the latency restriction). Similarly to Example 3, if an external process is working on the server, or if the server is handling tasks of another type, the system will be able to process even fewer concurrent requests (latency restriction).

It is assumed that for every load source it is possible to introduce such a constraint for pending load in the system. With such constraints, if the system is lacking resources, the source may not be able to achieve the given limit, but will work as if the limit was lower (we say that the ACM did not achieve its limit) The state in which tasks of some type are lacking resources and therefore are not able to achieve desired speed regardless of the value of its limit, is called resource saturation (or just saturation). In the present invention, it is assumed that each ACM can detect the situation in which a load is working too slow because of saturation.

A load may not achieve its limit not only because of saturation, but also because it has not enough work. This happens, for instance, for background tasks if there are too few background tasks to be executed, or for user load if the external application writing to the system has low throughput.

(ACM Information)

The information (called info) sent from each ACM to the algorithm consists of the following fields.

limit—the limit for the speed of work of the source, as described above. This value was previously set by the algorithm and it is sent back only to make the algorithm stateless.

hasWaitingWork—indicates that the source has tasks waiting for execution (see Example 5). It is assumed that amount of work in the near future will be close to the current amount. If the source has waiting work, then we can increase the speed of its work by either increasing the limit or giving it more resource (by decreasing the limits for other sources).

throughput—the throughput generated by tasks of corresponding load type since the previous info was collected. It is the progress indicator (see above).

limitAchieved—indicates whether the load type has achieved its limit (see Example 6). As described above, a source may not use its limit because of lacking resources (saturation), or because of no work.

EXAMPLE 5

To see how hasWaitingWork can be computed consider a source that processes tasks from a buffer. A task is sent from the buffer to the system when the ACM limit allows for it, and when there are no additional resource constraints. The resource constraints are, for example, no available memory in the system, too high latency of the processed requests (see Example 4), or pending load in the system above some predefined value (see Example 3). In such model, hasWaitingWork will tell if there are any requests waiting in the buffer.

EXAMPLE 6

Consider the following two cases to see how limitAchieved can be computed. If the limit is an upper bound on the throughput (see Example 3), limitAchieved will be true if and only if the equality throughput=limit was reached at some moment since the last info was collected.

If the limit is an upper limitation for the number of concurrently executed tasks (see Example 4), limitAchieved will be true if and only if the equality n=limit was reached at some moment since last info was collected.

LimitAchieved can be false either because load source does not have tasks to be issued to the system (hasWaitingWork would be false in such case), or because the load source does not get enough resources (they are already saturated).

(The Algorithm)

Using the information collected from the ACMs, the algorithm deducts whether the limit for each load source should be increased, decreased or left unchanged. Based on this decision, the controller calculates new value for each limit The decisions taken by the algorithm depend on whether the system is saturated or not. Saturation is diagnosed when a load type has hasWaitingWork set 'true' and limitAchieved set 'false'. It means that this load source has work to do and its limit allows for faster speed, but the speed cannot be increased because of lacking resources. Therefore, in order to increase its speed of work, the limit for other types of load should be decreased. On the other hand, if the system is not saturated (each load either does not have work or achieves the given limit) the algorithm will increase the limit for at least one load (see Lemma 2).

The skeleton of the algorithm is presented in Algorithm 1 shown in FIG. 4. As input, it takes information collected from the ACMs and a progress policy, which is a map of shares. The first three steps initialize local variables. In Steps 4 and 5, the current progress shares are counted. Steps 6 to 8 initialize the variable someoneHasWork. Following steps of the algorithm are described in the next subsections.

(Recounting Target Shares)

In Step 10, the algorithm distributes the shares of loads that have no waiting work among the loads that have. Loads that do not have waiting work are left only with the shares they utilize, and the remaining part of their share is distributed among loads that have. This share recounting is done to assure maximal resource utilization and correct progress division. It is illustrated in Example 2 and described below in detail.

If a load type, L, has no waiting work and its current share is lower than the one given in the policy (hasWaitingWork=false and currentShare<policyShare), then the load is not able to use its entire share. Its target share is set to the current one:

targetShares[L]=currentShares[L]

Otherwise (currentShare>=policyShare or hasWaitingWork=true) the target share is set to:

targetShares[L]=policyShares[L]

In the first case, the spare share: policyShares[L]−currentShares[L] is divided between other types of load according to their policy shares.

We say that a load type 1 is eligible to get more resources if currentShares[1]<=targetShares[1]. At least one of the load types having waiting work is eligible to get more resources, which is formally expressed by the following invariant:

(Lemma 1) If there are load types for which hasWaitingWork=true, then at least one of them has currentShare<=targetShare.

(Proof) All types of load which do not have waiting work (hasWaitingWork=false) have targetShare<=currentShare (consider two cases separately: currentShare<policyShare and currentShare>=policyShare in the rule of computing targetShares). This implicates the following Math. 2.

$$\sum_{\substack{loadTypel:\\ hasWork=false}} targetShare[l] \leq \sum_{\substack{loadTypel:\\ hasWork=false}} currentShare[l] \qquad \text{[Math. 2]}$$

Additionally, the sum of all target shares is equal to the sum of all current shares (which is 100%), so the following Math. 3 is established.

$$\sum_{\substack{loadTypel:\\ hasWork=true}} targetShare[l] \geq \sum_{\substack{loadTypel:\\ hasWork=true}} currentShare[l] \qquad \text{[Math. 3]}$$

Now it is clear that currentShare<=targetShare for at least one load type with hasWaitingWork=true.

With this lemma, we will later show that the algorithm keeps the system fully loaded.

After the target shares are computed, the algorithm makes the decisions and then updates the limits so that the throughput of the corresponding types of load are proportional to these shares.

(Trying to Increase Limits)

In steps 12 to 15, the algorithm tries to increase the limit of some loads. The algorithm can be considered greedy (in terms of increasing the limit) because it tries to increase the limit of some load if only such increase would have an effect, and if such increase was proper in terms of policy. To have its limit increased, a load must satisfy all of the following: (i) it needs resources (hasWaitingWork), (ii) it is eligible to receive more resources (currentShare<=targetShare), (iii) its limit is achieved (limitAchieved is true).

The first two conditions are intuitive. The third one ensures that the algorithm does not do operations without an effect. As described above, if hasWaitingWork is 'true' and the source is not able to achieve a given limit, it means the system is saturated and increasing the limit would have no effect.

Now, using Lemma 1 we can prove the following invariant.

(Lemma 2) If there is work in the system (at least one load type has waiting work), then either the system is already saturated or the limit for some load type will be increased.

(Proof) Let us assume there is some work in the system and consider load types having work. Either one of them has limitAchieved=false, which means the system is already saturated, or every load has limitAchieved=true. In the second case, we can use Lemma 1 and infer that there is at least one load type, 1, which satisfies all of the following:

hasWaitingWork[1]=true
limitAchieved[1]=true
currentShares[1]<=targetShares[1], so the limit for 1 will be increased by the algorithm.

(Trying to Decrease Limits)

If no source was increased, but there are loads which are able to produce tasks, it means that the system is saturated (see Lemma 2). In such case, the loads which consume too many resources are slowed down in Steps 17 to 20. The released resources will be captured by other loads.

EXAMPLE 7

Coming back to Example 2, let us assume the currentShare of loadType$_2$ is 20% and the currentShare of loadType$_3$ is 55%, and there are tasks of both load types waiting for execution (hasWaitingWork=true). According to the target shares (25%.45%.30%) loadType$_2$ works too slow. The algorithm makes one of two decisions.

Increase limit for loadType$_2$—this will happen if loadType$_2$ saturates the given limit (limitAchieved).

Decrease limit for some other load—this will happen if loadType$_2$ is already unable to saturate the given limit. The algorithm will decrease the limit for loadType$_3$ because it works faster than the speed given by its target share.

(Sending Decisions to the Controller)

In steps 22 and 23, the decision, currentShare, targetShare and old limit are sent to the controllers, which calculate the exact values for the limit (see below).

(Finding the Exact Value for the Limit)

The algorithm described above makes the decision increase/decrease/leave unchanged for each source. The decision is then converted to a particular limit value by the controller. There are various possibilities for implementing such controllers. We decided to use the one presented in Algorithm 2 shown in FIG. 5.

The implementation presented in the present invention changes the limit proportionally to the difference |targetShare—currentShare| and some constant factor alpha. In this way, the change is bigger when the current progress division differs a lot from the desired one, which ensures quick convergence to proper shares. In each step, the fraction of the overall progress of a load type gets closer to its targetShare. When the progress division converges, the changes to the limit are becoming smaller (this eliminates the limit fluctuations).

The constant alpha determines how abrupt the changes will be. High alpha results in faster convergence but the system may became unstable. Low alpha improves stability, but the convergence for desired values is slower. In our implementation, we have chosen alpha=0.2.

(The Properties of the Algorithm)

The algorithm has the following properties:

1. It keeps the system fully loaded provided there is enough work to do so. This is a direct conclusion from Lemma 2. Either the system is saturated, or the limits for some load types will be increased.

2. If the system is saturated, the division of the overall progress is corrected towards the targetShare. Consider a load type that has currentShare<targetShare. In each step, either its limit will be increased or the limit of another load type will be decreased. In both cases, it will get more resources. By analogy, a load type that has currentShare>targetShare will get less resources.

3. If the system is not saturated, every load proceeds at full speed.

(Controller Design)

In the above, we have described a general solution that ensures desired progress division and maximal resource utilization. Here, we describe additional mechanisms of the controller which improve the reaction time of the resource management mechanism.

(Faster Limit Decrease)

Consider the following example showing that decreasing the limit may not take effect instantly.

EXAMPLE 8

Let the limit for the source be defined as an upper limitation for the throughput. Consider the following sequence.

1. The source has work, and it is the only load in the system having work, so its limit is increased (let us say to the value 50 MB/s).

2. The source finishes its tasks, so it does not have work. Its limit is still 50 MB/s.

3. After a while, the source starts working, but now it is not the only load in the system. As a result, it has waiting work, its limit is still 50 MB/s, but works with the throughput 25 MB/s (it does not have resources to work with the higher speed).

Now, if the algorithm decreases the limit for the source, let us say to 45 MB/s, it will not affect the speed of work of the source, as it is working with the speed 25 MB/s anyway. Only after several cycles of the algorithm, the limit will be decreased below 25 MB/s and will start affecting the speed of work of the source.

The situation described in Example 8 can have significant effect on the convergence speed to the target shares, so it is useful to introduce some improvement. We propose two alternative solutions described below.

(Keeping Throughput Close to the Limit)

The controller can try to keep the limit always close to the current speed of work of the source. If the limit is the limitation for the throughput (see Example 3), it tries to modify the limit so that it is not much higher than the current throughput, for example:

$$\text{limit} \leftarrow \min(\text{limit}, \text{throughput} \times \alpha + \beta); \alpha > 1 \quad \text{[Math. 4]}$$

If the limit is the limitation for the number of concurrently processed tasks (see Example 4), we try to keep the limit close to the current number of concurrent tasks in the system, n, for example:

$$\text{limit} \leftarrow \min(\text{limit}, n \times \alpha + \beta); \alpha > 1 \quad \text{[Math. 5]}$$

We have chosen values for alpha and beta so that the reaction time is satisfactory. In the system of the present invention, alpha is set to 1.2, and beta is chosen for each source separately.

(Decreasing the Limit to the Current Speed)

Let us assume we want to decrease the limit to the value L (in Example 8, L=45 MB/s). If L is higher than the current speed of work of the source, the limit should be decreased at least to the value of the current speed (in Example 8 it is 25 MB/s). If the limit is the limitation for the throughput:

$$\text{limit} \leftarrow \min(\text{limit}, \text{throughput}) \quad \text{[Math. 6]}$$

If the limit is the limitation for the number of concurrently processed tasks:

$$\text{limit} \leftarrow \min(\text{limit}, n) \quad \text{[Math. 7]}$$

(Faster Limit Increase)

Consider increasing the limit from a small value (e.g. 1) to a big value (e.g. 10000). In Algorithm 2 we can see that the increase step is proportional to the oldLimit. Therefore, such a change would require significant number of cycles and would result in unsatisfactory reaction time. We decided to provide some minimal limit (min-Limit) that improves the speed of the convergence in case of low values of the limit:

$$\text{newLimit} \leftarrow \max(\text{newLimit}, \text{minLimit}) \quad \text{[Math. 8]}$$

(Algorithm in HYDRAstor)

HYDRAstor (NPL 3) is a scalable high-performance distributed content-addressable storage system aimed at the enterprise market. The system consists of a back-end which is a grid of storage nodes built around a distributed hash table, and a front-end. Each storage node is responsible for handling read and write requests. The system supports deduplication, so some write requests do not introduce overhead caused by preserving a data block on disk. Apart from handling user write and read requests, the back-end executes background tasks, such as data reconstruction after failure, defragmentation, data scrubbing for early error-detection, data balancing between nodes, or garbage collection and space reclamation. Background tasks have differentiated characteristic and importance.

Adaptive high-level resource management is used in HYDRAstor for scheduling different types of tasks. There are three main classes of tasks in HYDRAstor: user requests (writes and reads), data deletion (marking blocks for removal), and background tasks (reconstructions, defragmentation, space reclamation, etc.). A single storage node can execute concurrently all kinds of tasks, which use the same resources while being handled by different software components. The tasks in HYDRAstor are difficult to be modeled.

(Writes and Reads)

Writes and reads in HYDRAstor are handled by several components and use various resources (disk, CPU, memory, network). Writes require chunking a data stream to blocks, eliminating duplicates, compressing the blocks, erasure-coding the compressed blocks into a set of fragments, and preserving the fragments at appropriate storage nodes. Because of deduplication, some blocks are already stored and do not require compressing, erasure-coding, and preserving. For better duplicate elimination, blocks are of variable sizes, so the overhead associated with handling a single request is not always the same, and it is even difficult to estimate. The system uses several levels of caching, which also makes estimating the burden of the write and read requests difficult. Write and read requests are also specific because they require response time to a single request to be below a predefined value.

(Background Tasks)

Besides user writes and reads in HYDRAstor, there is a set of maintenance tasks. They are transparent for user, executed in the background, and include tasks like reconstructions of parity data, space reclamation (removing blocks marked for deletion), defragmentation. The background tasks vary widely in resource consumption.

Some of them, like defragmentation, perform operations on large blocks of data and issue load mainly on hard disks. The others, like meta-data synchronization, operate on much smaller chunks and consume relatively more CPU rather than other resources. The tasks have also various priorities. Critical reconstructions of data have priority over defragmentation or space reclamation. Space reclamation can be, on the other hand, executed with higher priority when the system is running out of space.

When scheduling tasks in the system, a simple solution is to execute a task of a given priority only when there are no tasks of higher priority. In HYDRAstor this approach was adopted for choosing a particular background task for execution. However, other load types (e.g. user load) must not be stopped even if there are background tasks of the highest priority.

A background task takes much longer than a read/write operation and cannot be preempted when started. To reduce their influence on read/write top performance, and to tolerate fluctuations in user load, background tasks should be started gradually when spare resources are detected.

(Deletion)

Because of HYDRAstor architecture and support for deduplication, data deletion is a separate, quite complicated process which requires significant computational power. The system allows for running deletion in parallel with other background tasks as well as with user reads and writes.

(State-Dependent Resource Division)

Policies in HYDRAstor alter in response to changing conditions of the system. For example, after failures that significantly reduce resiliency level of some data, there will be a critical reconstruction policy in effect, which gives significant share to background tasks. Various polices depending on the state of the system are defined in FIG. 6 showing progress shares. The resource management algorithm always uses the policy that corresponds to the current state.

(Local Architecture)

HYDRAstor is a distributed system. Each node holds an instance of the resource management mechanism, which works locally. Some of the tasks, however, use resources of multiple nodes. Such tasks must be synchronized so they can be executed on all the nodes involved with the same speed. Different nodes can have different computation power and may have different resource availability, hence tasks that involve multiple nodes may have to wait on one node for computations on other nodes. In consequence, such tasks may be executed with the speed lower than the one guaranteed by the policy. But, as long as all the nodes have the same policies, every task will be given progress share according to the policy on at least one node.

If a node executes a task slower than allowed by the policy because this task has to be synchronized with a slower remote node, the local node will be executing other tasks (if any) to maximize the use of resources.

(Experimental Evaluation)

Here, we present the results of two experiments conducted on the HYDRAstor system which prove two main properties of the resource management mechanism: (i) the algorithm keeps system fully utilized, and (ii) in the case of resource saturation, the progress division is close to the indicated by the policy.

(Experimental Setup)

For all experiments, we used a 4-server configuration of HYDRAstor. Each server had two quad-core, 64 bit, 3.0 GHz Intel Xeon processors, 24 GB of memory, and twelve 7200 RPM Hitachi HUA72101AC3A SATA disks. All servers ran a 2.6.18 Linux kernel. Each server held two logical storage nodes.

The experiments were done with an application that was configurable to write to the system with the given throughput. The application could also be configured to work with maximum speed allowed by the system (according to latency restriction—see above).

(Maximal Resource Utilization)

The first experiment shows that if writes do not consume all the resources in the system, then background tasks are let in so that all the resources are fully utilized.

In this experiment, we generated tasks of two load types: writes and background tasks. The characteristic of writes changed three times. For the first 30 minutes, external application worked full speed achieving 55 MB/s per node. Then, in the $30^{th}$ minute, the configuration was changed so that the application generated constant throughput of 40 MB/s. In the $60^{th}$ minute, the write speed was changed again to 10 MB/s. Finally, in the $90^{th}$ minute, we set the write speed to 45 MB/s but included duplicated data. In parallel to handling user writes, the system was doing defragmentation. There was a lot of data in the system so there were always defragmentation tasks waiting for execution.

The test uses the "Data defragmentation" policy from FIG. 6, which means the overall progress should be divided only between user writes and data deletion. Because in this experiment there is no data deletion, the whole 100% of the progress should be given to user writes. Background tasks should be allowed to proceed only if there are unused resources in the system.

Figure 7:
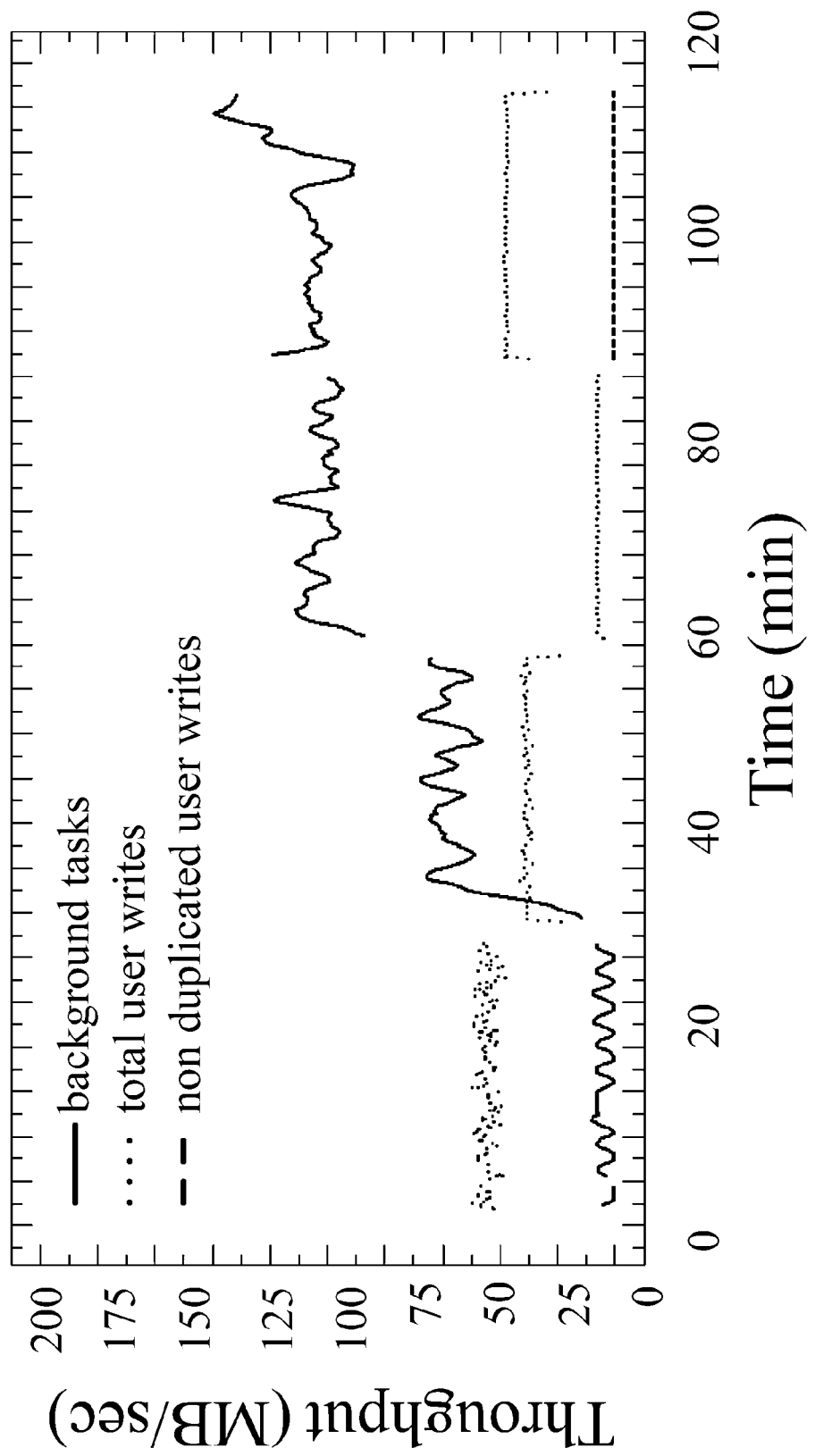
FIG. 7 is a chart showing experimental results of the first exemplary embodiment.
Figure 8:
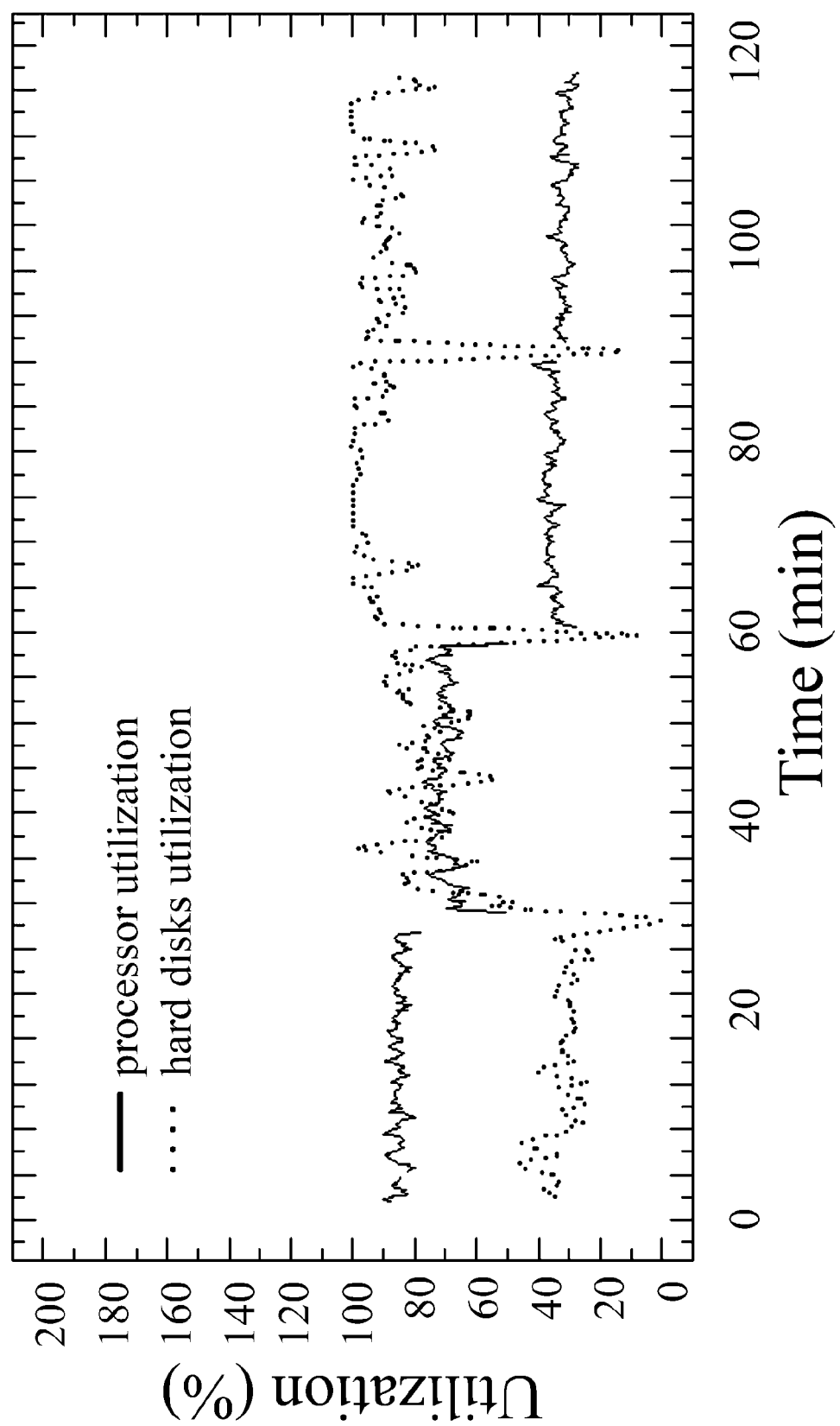
FIG. 8 is a chart showing experimental results of the first exemplary embodiment.

The results of this experiment are presented in FIG. 7. The plot shows the throughput of user writes (which in the last period is divided into total write throughput and not duplicated data throughput) and background tasks from one storage node. FIG. 8 shows the utilization of the processor and hard disks, allowing to identify the bottleneck resource in each phase of writing.

In the first period, minutes 0-30, the writing application worked at full speed, and the background tasks did not do much. In this phase, the processor was a bottleneck. In the second period, minutes 30-60, the application worked slower, so unused resources were allocated to the background tasks. The background tasks achieved a significant progress and, according to these expectations, did not affect the throughput of the writes. In this phase, the hard disks were a bottleneck—they achieved the highest utilization possible within latency constraint. In the third period, minutes 60-90, when the application was working even slower, the background tasks were allowed to achieve higher throughput. In this phase, there were fewer write tasks executed concurrently so it was easier to maintain their latency bounded. As a result, we managed to obtain almost 100% utilization of hard disks. In the fourth period, minutes 90-120, writes, in spite of their high throughput, introduced small burden on the system (almost all writes were duplicates), so the background tasks achieved high speed once again.

Considering that the maximal throughput achieved by background tasks, 110 MB/s, was higher than the one achieved by user load, 55 MB/s, we see that write operations were heavier than defragmentation tasks. Such difference can be corrected by using scaling factors, as described above. In HYDRAstor we decided not to use any corrections and use the actual throughput.

(Policy Changes)

The second experiment presents changes of the current policy. The external application writing to the system was configured to work at full speed for the whole duration of the experiment. For the first hour, the system executed defragmentation tasks so it used the "Data de-fragmentation" policy from FIG. 6. Next, in the 60th minute, we simulated a failure of one storage node so the system changed the policy to "Normal reconstruction" and started reconstructing data. After 25 minutes (in the 85th minute), we started data deletion, which did not change the policy, but made a new load type appear in the system.

Taking into account that writes and background tasks always had waiting work, and that deletion had waiting work only in the third phase, in the three test steps we had expected the following progress divisions:

1. In the $1^{st}$ period (minutes 0-60): 100% for the writes.
2. In the $2^{nd}$ period (minutes 60-85): 71.5% (50%+5/7*30%) for writes and 28.5% (20%+2/7*30%) for background tasks—30% of deletion share is divided between writes and background tasks in proportion 5:2.
3. In the $3^{rd}$ period (minutes 85-140): 50% for writes, 20% for background tasks and 30% for data deletion.

Figure 9:
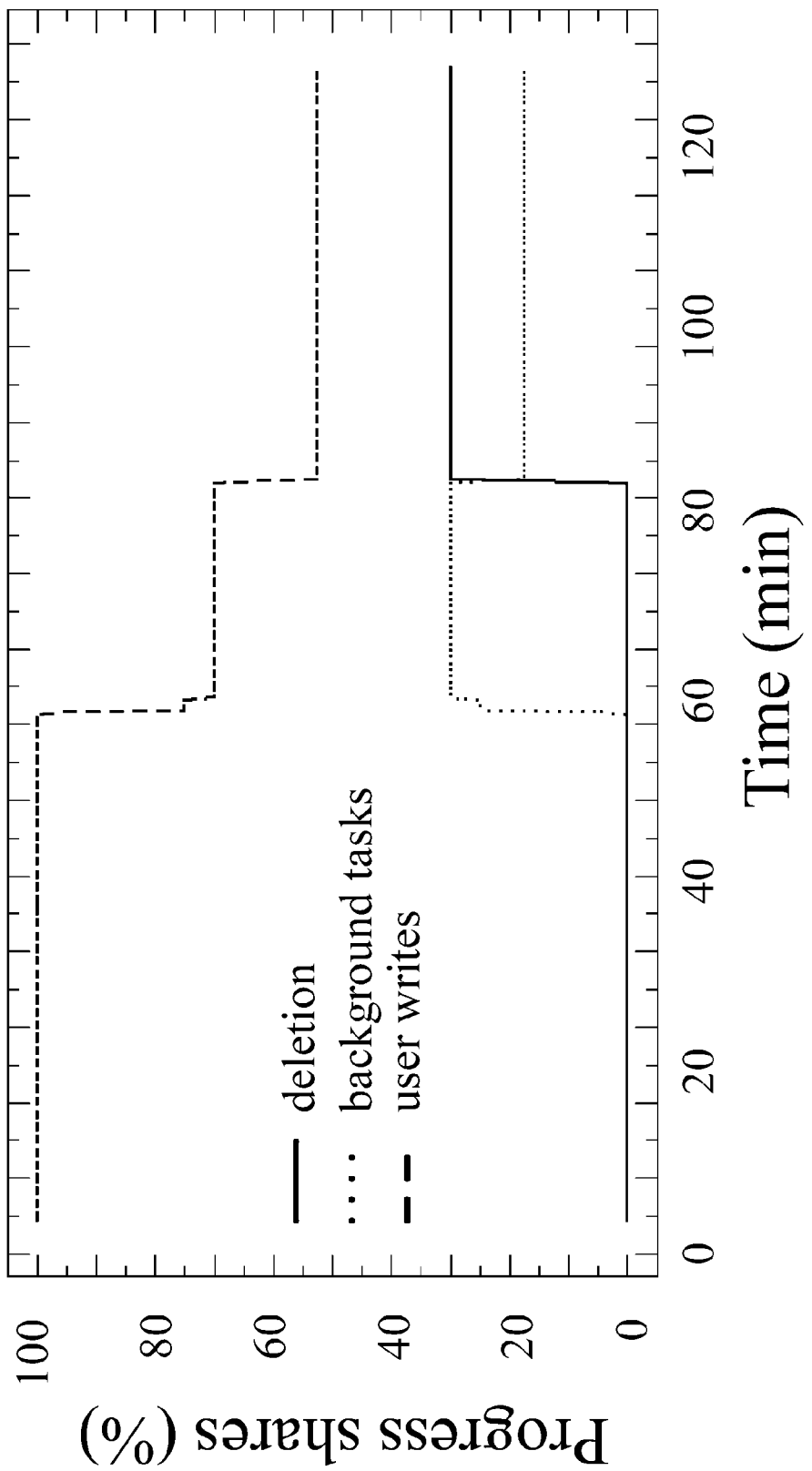
FIG. 9 is a chart showing expected progress shares in an experiment of the first exemplary embodiment.
Figure 10:
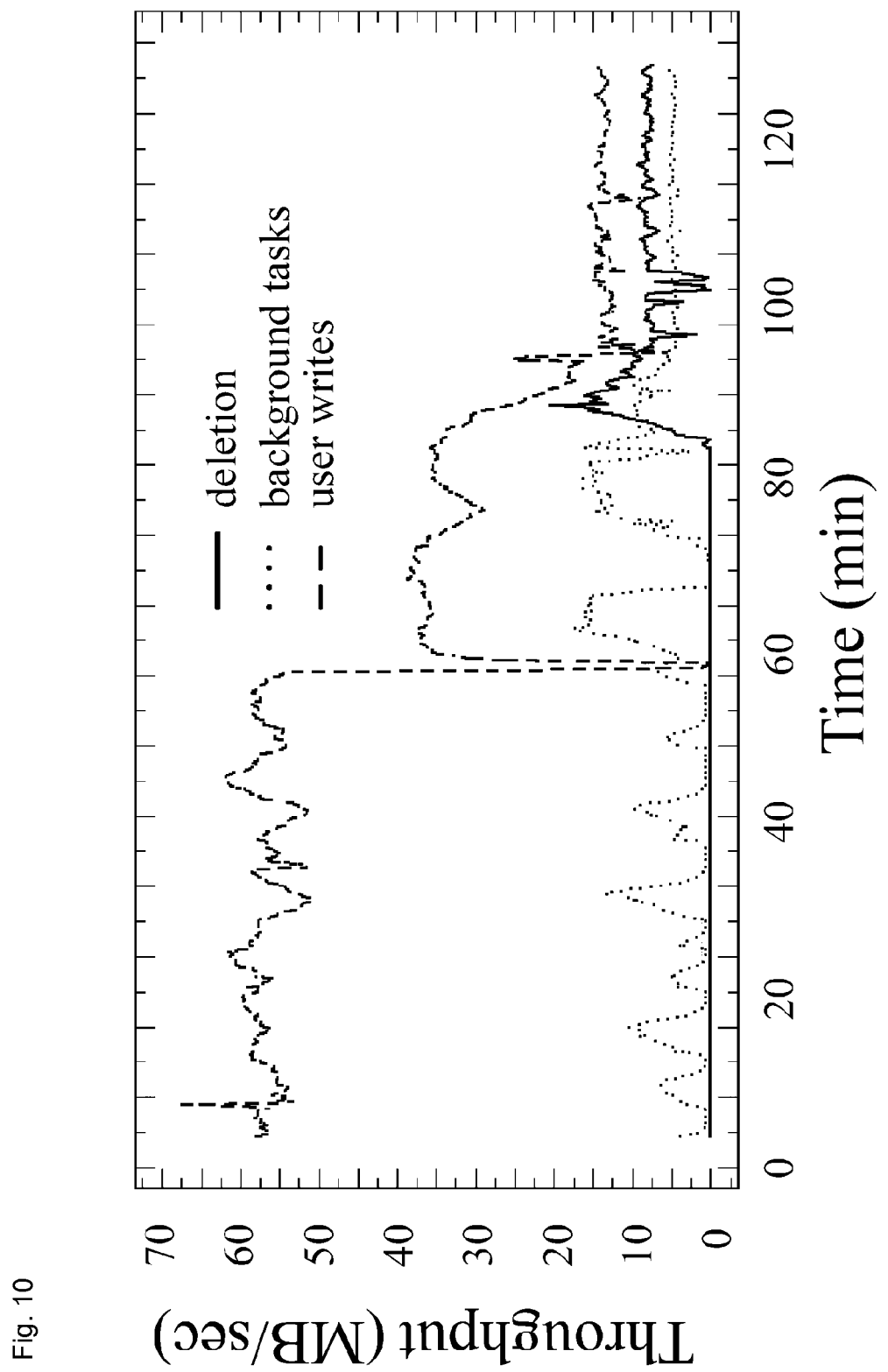
FIG. 10 is a chart showing experimental results of the first exemplary embodiment.

FIG. 9 presents the expected progress divisions, while FIG. 10 presents the throughput achieved by user writes, background tasks and data deletion on one of the storage nodes. The result progress divisions (writes—background tasks—deletion) are as follows: 95%-5%-0% in first period, 76%-24%-0% in the second period and 48%-21%-31% in the third period.

(Related Work)

New trends in the application of the control theory encourage to use model-based solutions. However, in the present system, tasks have differentiated nature not only with respect to resource consumption, but also with respect to other requirements such as bounded latency, limited memory, or distributed execution. Considering the complicated architecture of the present system and, in consequence, the impossibility of modeling it accurately, it is decided to introduce a new approach of adaptive high-level resource division in the present invention.

The problem of scheduling tasks in distributed storage systems is common and frequently described. Most literature available addresses the problem of sharing resources among tasks of the same type or scheduling packets of a known size. The present invention addresses the issue of dividing resources among user load and background tasks, which is, due to the different characteristic of the tasks, fairly more complicated. Other existing solutions try to execute background tasks in idle periods but such methods are inadequate when servers constantly handle user requests and when background tasks can effectively be executed in parallel to user activity.

Many of the existing solutions for tasks scheduling use the mechanism of queuing: YFQ, SFQ and FSFQ, or their modifications. Each load source puts its tasks in its queue. The tasks are taken from the proper queue and sent to the system in order to achieve the desired division of the progresses. In the case of the present system, the problem with this approach is maintaining queues of proper size, which is particularly difficult when tasks have differentiated characteristics. Queuing also results in additional memory overhead and increases requests latency, which in systems like HYDRAstor is unacceptable. Queuing mechanisms also require a task model, and in the present case, they do not provide a clear answer for questions related to performance, for example how many requests can be handled in parallel.

Some solutions combine application of the queuing theory with the feedback control loop based on the latency restriction. Standard queuing is enriched with the mechanism that determines the number of concurrently processed tasks so that their latency requirements are met. These solutions are, however, dedicated to the resource division among tasks of similar characteristic.

Resource division of tasks of different nature is most often accomplished through virtualization. Each virtual machine hosts a single application performing an appropriate class of tasks. Although virtual machines allow for accurate division of CPU cycles among applications, such approach results in architectural and implementational limitations and introduces significant performance overhead.

(Conclusions and Future Work)

In the present invention, a novel mechanism for dividing resources among tasks of different load types is presented. The new approach is based on abstraction of the tasks and avoids assumptions about their characteristic. Therefore, it is suitable for the distributed systems, where standard methods of defining a model fail due to complex system architecture. The mechanism was implemented in the commercial system HYDRAstor, with the focus on achieving high performance of the controlled system. Both theoretical deliberations and experimental evaluation have confirmed that the algorithm keeps the system in a saturated state, which means the maximal utilization of the resources. According to the experiments, the controlled system is stable (there are no serious fluctuations of throughputs nor overshoots) and the progress division converges to the desired one—indicated by the policy. Also the reaction time is satisfactory—the experiments show that it takes reasonable time to adapt to a new progress division and to changes in the workload. We conclude that adaptive high-level resource management is suitable for high-performance concurrently computing servers.

Future works will relate using the control theory in the controller design in order to further decrease the reaction time of the mechanism while keeping the system stable.

<Second Exemplary Embodiment>

Figure 11:
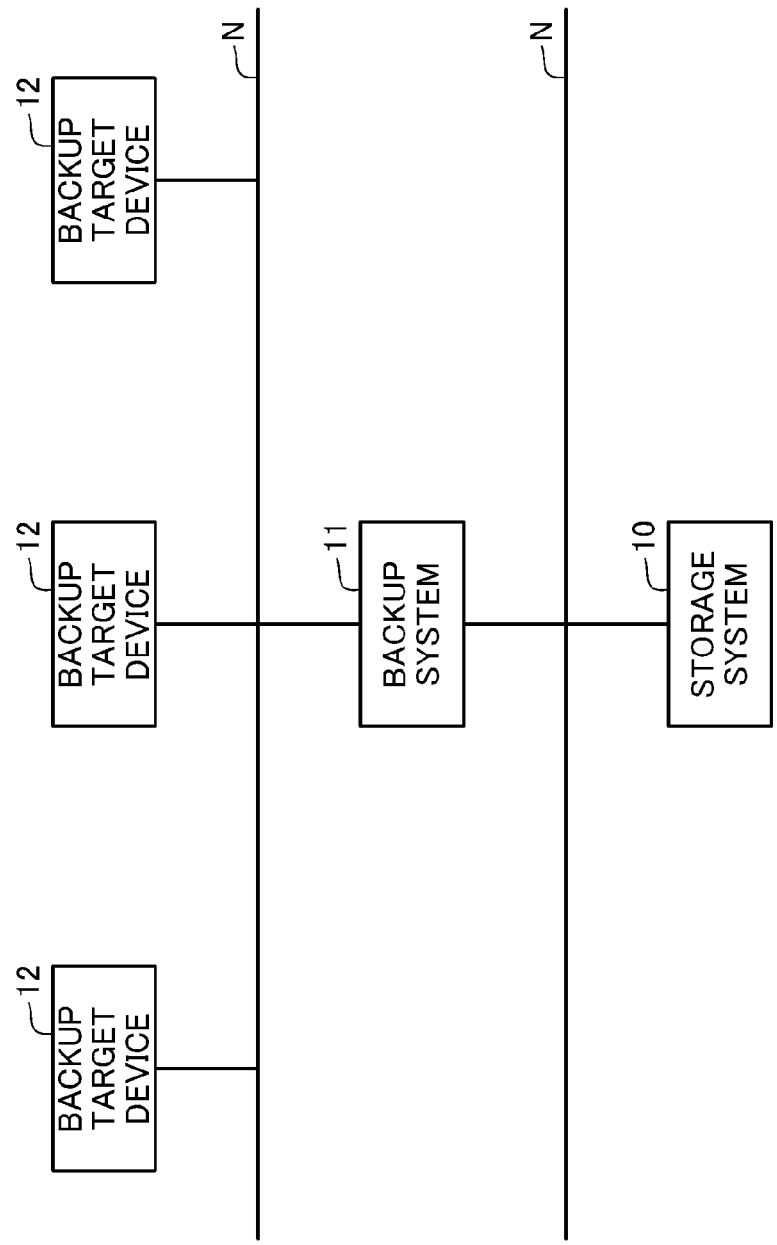
FIG. 11 is a block diagram showing the configuration of the entire system including a storage system of a second exemplary embodiment.
Figure 12:
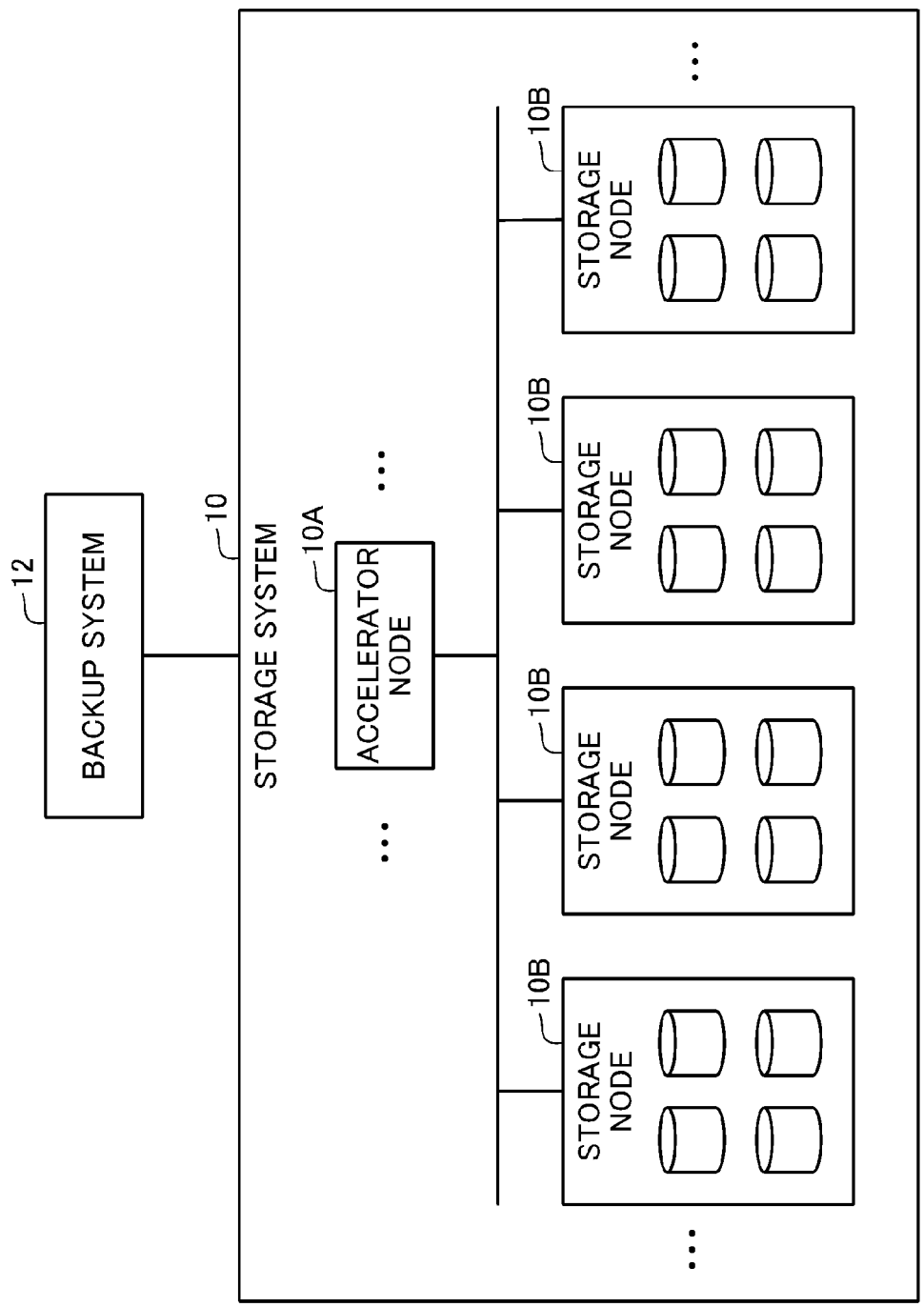
FIG. 12 is a block diagram schematically showing the configuration of the storage system of the second exemplary embodiment.
Figure 13:
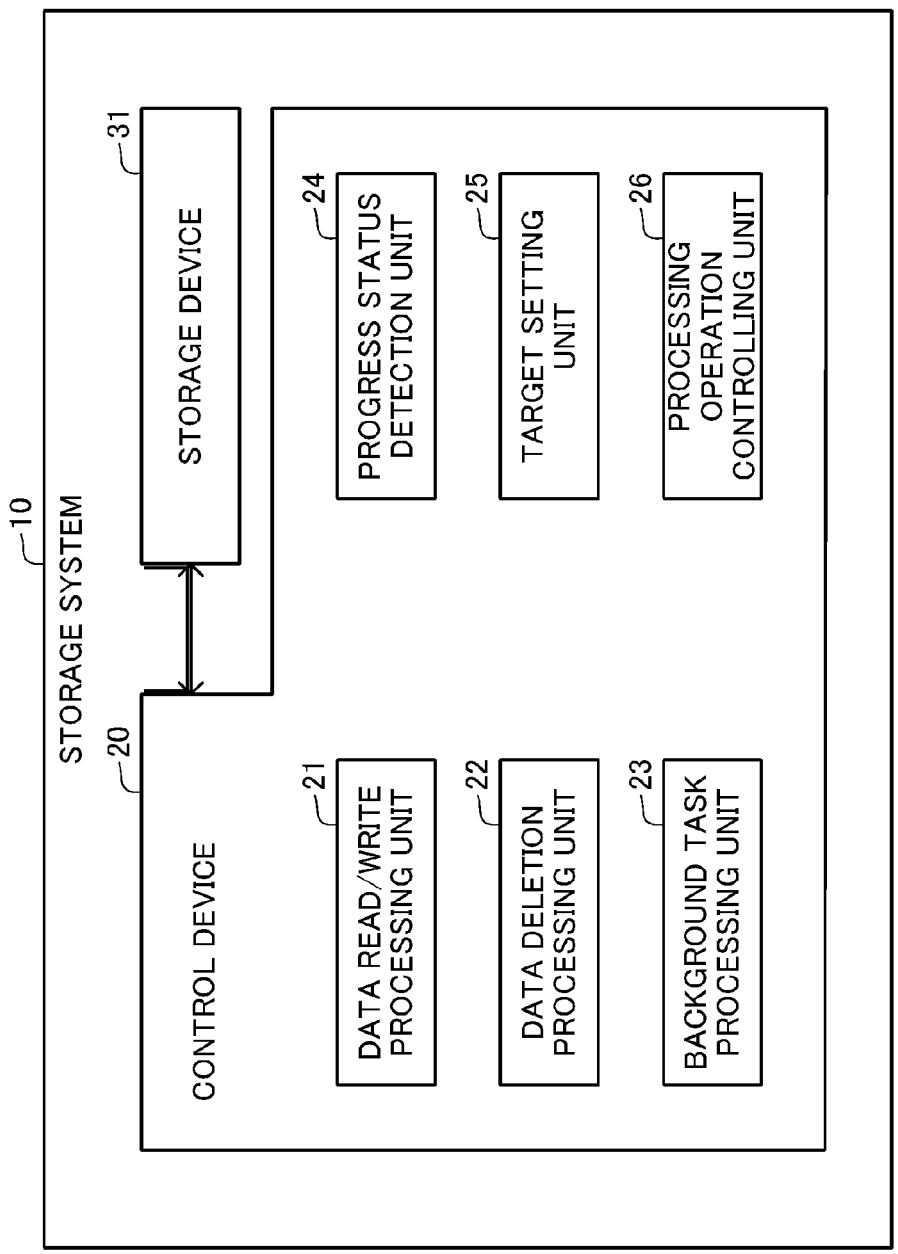
FIG. 13 is a function block diagram showing the configuration of the storage system of the second exemplary embodiment.

A second exemplary embodiment of the present invention will be described with reference to FIGS. 11 to 17. FIG. 11 is a block diagram showing the configuration of the whole system. FIG. 12 is a block diagram schematically showing a storage system, and FIG. 13 is a function block diagram showing the configuration. FIGS. 14 to 17 are explanation views for explaining the operation of the storage system.

This exemplary embodiment herein shows a case that the storage system is a system such as HYDRAstore and is configured by connecting a plurality of server computers. However, the storage system of the present invention is not limited to the configuration with a plurality of computers, and may be configured by one computer.

As shown in FIG. 11, a storage system 10 of the present invention is connected to a backup system 11 that controls a backup process via a network N. The backup system 11 acquires backup target data (storage target data) stored in a backup target device 12 connected via the network N, and requests the storage system 10 to store. Thus, the storage system 10 stores the backup target data requested to be stored as a backup.

As shown in FIG. 12, the storage system 10 of this exemplary embodiment employs a configuration that a plurality of server computers are connected. To be specific, the storage system 10 is equipped with an accelerator node 10A serving as a server computer that controls the storing/reproducing operation of the storage system 10, and a storage node 10B serving as a server computer equipped with a storage device that stores data. The number of the accelerator node 10A and the number of the storage node 10B are not limited to those shown in FIG. 12, and a configuration that more nodes 10A and more nodes 10B are connected may be employed.

Further, the storage system 10 of this exemplary embodiment is a content address storage system that divides data and makes the data redundant, distributes the data and stores into a plurality of storage devices, and specifies a storing position in which the data is stored by a unique content address set in accordance with the content of the data to be stored. This content address storage system will be described later.

Assuming the storage system 10 is one system, the configuration and the function of the storage system 10 will be described below. In other words, the configuration and the function of the storage system 10 described below may be included in either the accelerator node 10A or the storage node 10B. The storage system 10 is not limited to the configuration including the accelerator node 10A and the storage node 10B, as shown in FIG. 12. The storage system 10 may have any configuration and, for example, may be configured by one computer. Moreover, the storage system 10 is not limited to a content address storage system.

FIG. 13 shows a configuration of the storage system 10. As shown in this drawing, the storage system 10 is equipped with a control device 20 that controls operation of the storage system 10, and a storage device 31 that stores data. The control device 20 is equipped with a plurality of processing units 21, 22, and 23, respectively associated with load sources described in the first exemplary embodiment and performing predetermined tasks. For example, as the processing units 21, 22, and 23, the control device 20 includes a data read/write processing unit 21 that controls storage and retrieval of data to and from the storage device 30, a data deletion processing unit 2 that detects block data which has not been used anymore and to be deleted, and a background task processing unit 23 that performs background tasks such as reconstruction of a data tree, and a process of defragmentation and space reclamation.

Further, the control device 20 also includes a progress status detection unit 24, a target value setting unit 25, and a processing operation controlling unit 26, as configurations for distributing shares of various resources (disks, CPUs, memories, networks, etc.) with respect to the above-described respective processing units 21, 22, and 23 within the storage system 10.

Actually, the respective units 21 to 26 in the control device 20 are configured by programs installed in a plurality of arithmetic devices such as a CPU (Central Processing Unit) of the accelerator node 10A and a CPU of the storage node 10B shown in FIG. 12, and in particular, the respective units 24 to 26 are configured in the storage node 10B. Moreover, the storage device 31 is mainly configured of a storage device of the storage node 10B.

The abovementioned program is provided to the storage system 10, for example, in a state stored in a storage medium such as a CD-ROM. Alternatively, the program may be stored in a storage device of another server computer on the network and provided from the other server computer to the storage system 10 via the network.

Hereinafter, the configurations of the units 21 to 26 included in the control device 20 will be described in detail. First, a content-address method of storing and retrieving stream data in block data units by the data read/write processing unit 21 will be described with reference to FIGS. 14 to 16.

Figure 14:
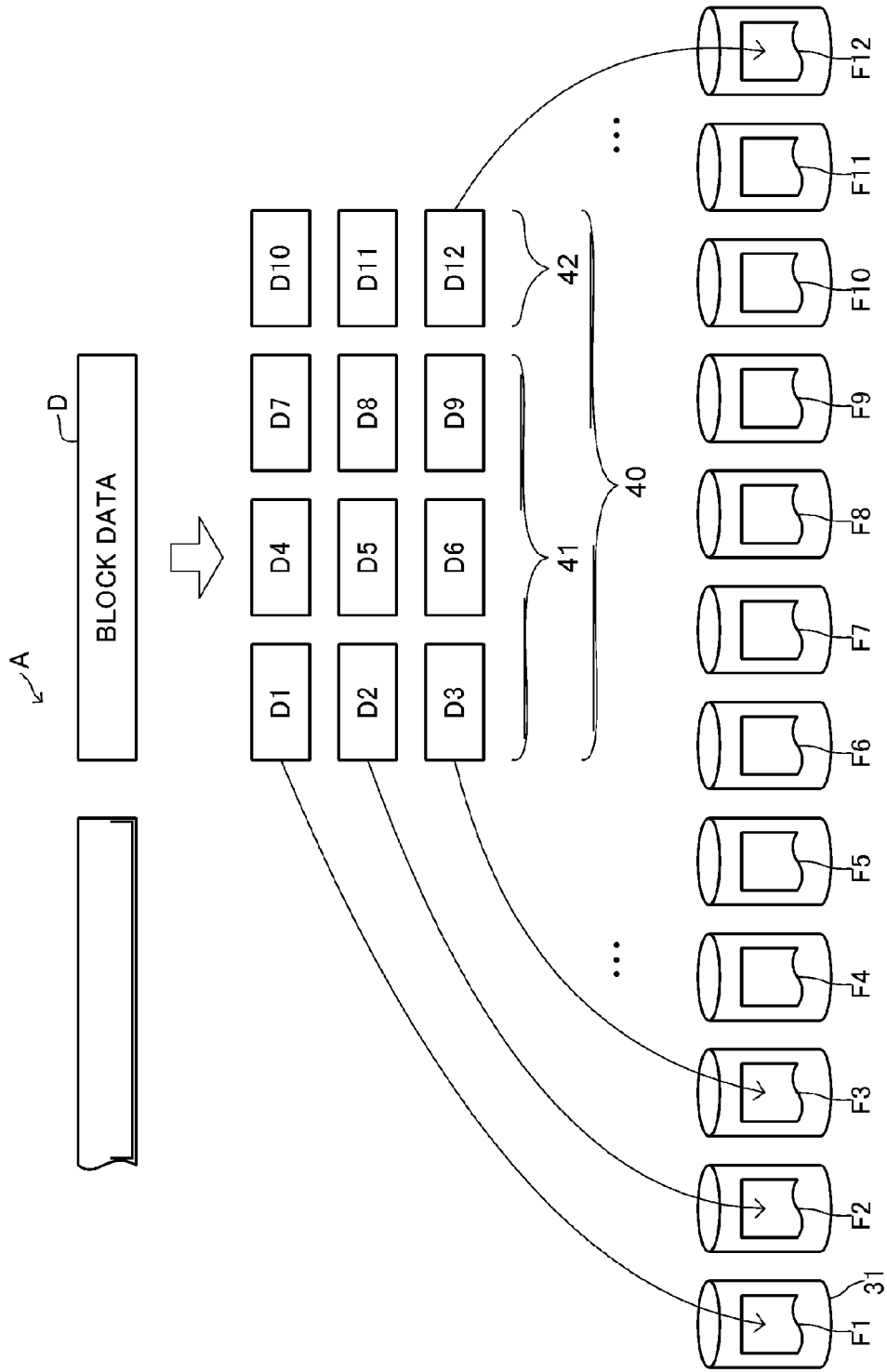
FIG. 14 is an explanation view for explaining an aspect of a data storage process in the storage system disclosed in FIG. 13.
Figure 15:
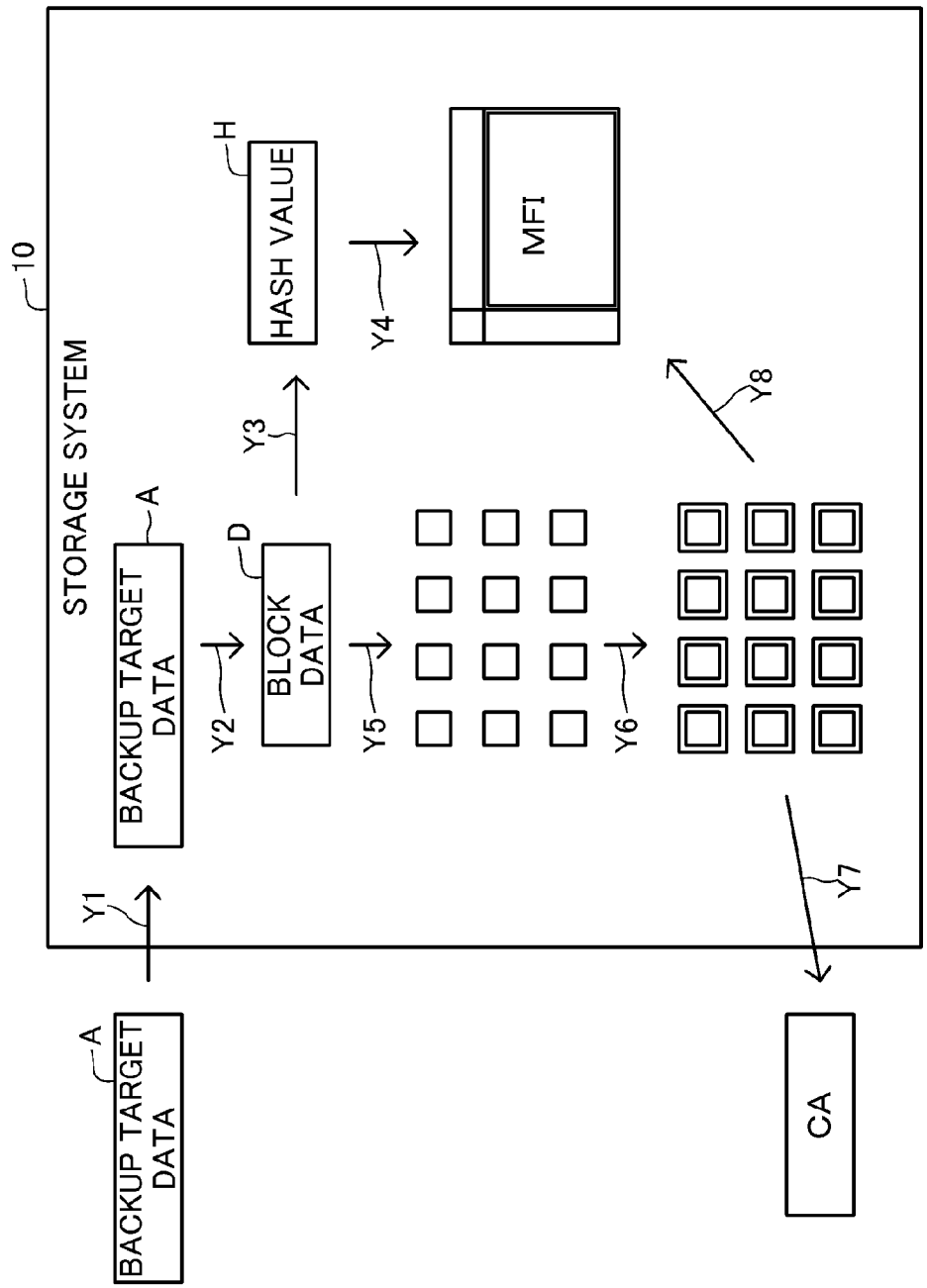
FIG. 15 is an explanation view for explaining the aspect of the data storage process in the storage system disclosed in FIG. 13.

First, when the data read/write processing unit 21 receives an input of the backup target data A, which is stream data, as shown by arrow Y1 in FIG. 15, the data read/write processing unit 21 divides the backup target data A into predetermined capacities (e.g., 64 KB) of block data D, as shown by arrow Y2 in FIGS. 14 and 15. Then, based on the data content of this block data D, the data read/write processing unit 21 calculates a unique hash value H (content identification information) representing the data content (arrow Y3). For example, a hash value H is calculated from the data content of the block data D by using a preset hash function. The process by the data read/write processing unit 21 is executed in the accelerator node 10A.

Then, by using the hash value H of the block data D of the backup target data A, the data read/write processing unit 21 checks whether or not the block data D has already been stored in the storage device 30. To be specific, the hash value H and content address CA that represents the storing position of the block data D having already been stored are related and registered in an MFI (Main Fragment Index) file. Therefore, in the case where the hash value H of the block data D calculated before storage exists in the MFI file, the data read/write processing unit 21 can determine that the block data D having the same content has already been stored (arrow Y4 in FIG. 15). In this case, the data read/write processing unit 21 acquires a content address CA related to a hash value H within the MFI that coincides with the hash value H of the block data D before storage, from the MFI file. Then, the data read/write processing unit 21 stores this content address CA (address data) as the content address CA of the block data D required to be stored. Alternatively, the data read/write processing unit 21 may store another piece of address data further referring to the content address CA referring to the block data D that has already been stored, in a tree structure. Consequently, the already stored data referred to by using this content address CA is used as the block data D required to be stored, and it becomes unnecessary to store the block data D required to be stored.

Further, the data read/write processing unit 21 compresses block data D determined that it has not been stored yet as described above, and divides the data into a plurality of pieces of fragment data having predetermined capacities as shown by arrow Y5 in FIG. 15. For example, as shown by reference numerals D1 to D9 in FIG. 15, the data read/write processing unit 21 divides the data into nine pieces of fragment data (division data 41). Moreover, the data read/write processing unit 21 generates redundant data so that the original block data can be restored even if some of the fragment data obtained by division are lost, and adds the redundant data to the fragment data 41 obtained by division. For example, as shown by reference numerals D10 to D12 in FIG. 14, the data read/write processing unit 21 adds three fragment data (redundant data 42). Thus, the data read/write processing unit 21 generates a data set 40 including twelve fragment data composed of the nine division data 41 and the three redundant data. The process by the data read/write processing unit 21 is executed by one storage node 10B.

Then, the data read/write processing unit 21 distributes and stores, one by one, the fragment data composing the generated data set into storage regions formed in the storage devices 31. For example, as shown in FIG. 14, in the case where the twelve fragment data D1 to D12 are generated, the data read/write processing unit 21 stores one of the fragment data D1 to D12 into one of data storage files F1 to F12 (data storage regions) formed in the twelve storage devices 31 (refer to arrow Y6 in FIG. 15).

Further, the data read/write processing unit 21 generates and manages a content address CA, which represents the storing positions of the fragment data D1 to D12 stored in the storage device 31 as described above, that is, the storing position of the block data D to be restored by the fragment data D1 to D12. To be specific, the data read/write processing unit 21 generates a content address CA by combining part (short hash) of a hash value H calculated based on the content of the stored block data D (e.g., the beginning 8 bytes in the hash value H) with information representing a logical storing position. Then, the data read/write processing unit 21 returns this content address CA to a file system within the storage system 10, namely, to the accelerator node 10A (arrow Y7 in FIG. 15). The accelerator node 10A then relates identification information such as the file name of the backup target data with the content address CA and manages them in the file system.

Further, the data read/write processing unit 21 relates the content address CA of the block data D with the hash value H of the block data D, and the respective storage nodes 10B manages them in the MFI file. Thus, the content address CA is related with the information specifying the file, the hash value H and so on, and stored into the storage devices 30 of the accelerator node 10A and the storage nodes 10B.

Furthermore, the data read/write processing unit 21 executes a control of retrieving backup target data stored as described above. For example, when the storage system 10 accepts a retrieval request with a specific file designated (refer to arrow Y11 in FIG. 16), based on the file system, the data read/write processing unit 21 firstly designates a content address CA, which is composed of short hash as part of a hash value corresponding to the file relating to the retrieval request and information of a logical position (refer to arrow Y12 in FIG. 16). Then, the data read/write processing unit 21 checks whether or not the content address CA is registered in the MFI file (refer to arrow 13 in FIG. 16). If the content address CA is not registered, the requested data is not stored, so that the data read/write processing unit 21 returns an error response.

Figure 16:
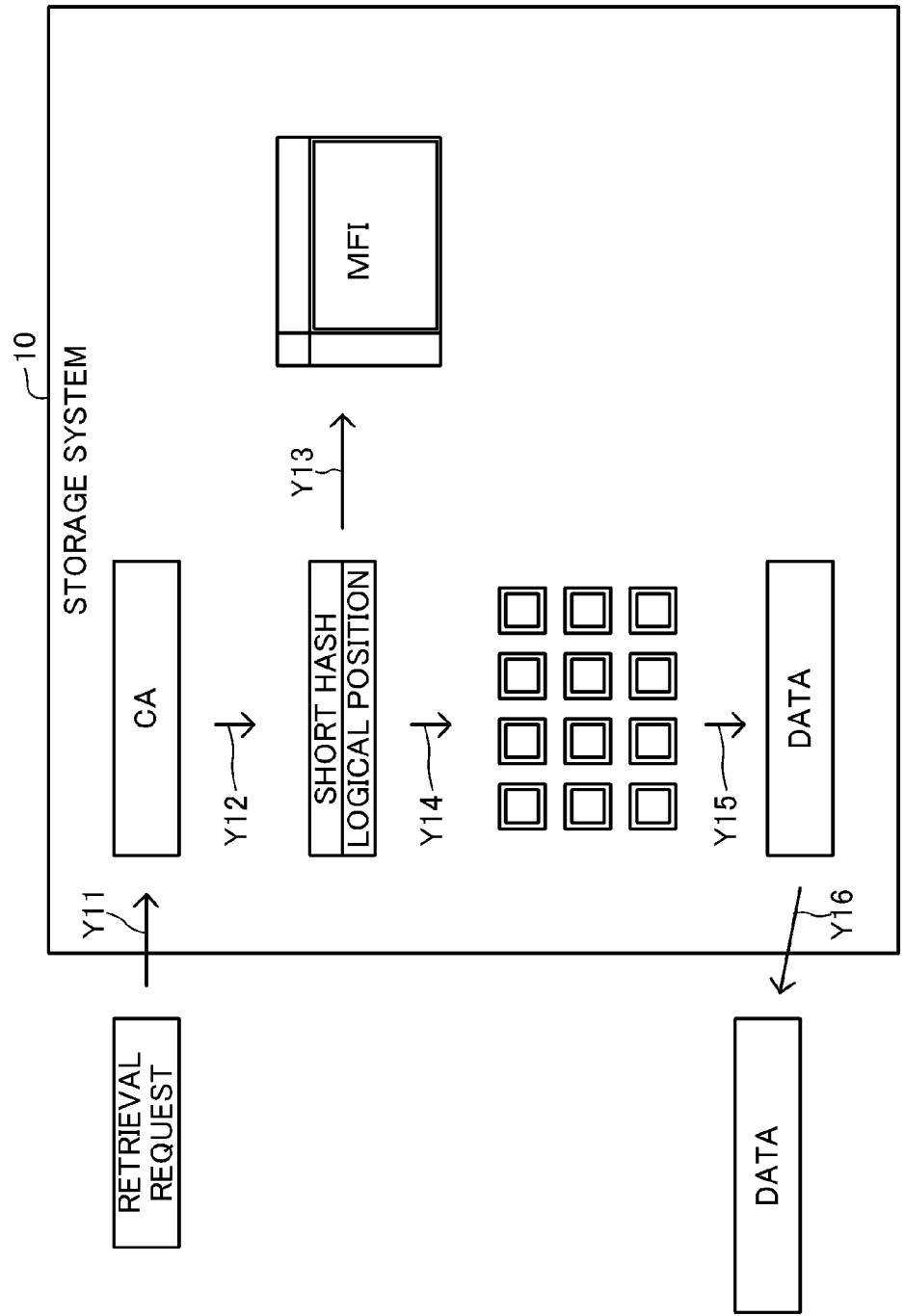
FIG. 16 is an explanation view for explaining an aspect of a data retrieval process in the storage system disclosed in FIG. 13.

On the other hand, if the content address CA relating to the retrieval request is registered, the data read/write processing unit 21 specifies a storing position designated by the content address CA, and retrieves each fragment data stored in the specified storing position as data requested to be retrieved (refer to arrow Y14 in FIG. 16). At this moment, if knowing the data storage files F1 to F12 storing the respective fragments and the storing position of one of the fragment data in the data storage files, the data read/write processing unit 21 can specify the storing positions of the other fragment data because the storing positions are the same.

Then, the data read/write processing unit 21 restores the block data D from the respective fragment data retrieved in response to the retrieval request (refer to arrow Y15 in FIG. 16). Moreover, the data read/write processing unit 21 connects a plurality of restored block data D to restore into a group of data like the file A, and returns to the accelerator node 10A that is controlling the retrieval (refer to arrow Y16 in FIG. 16).

The data deletion processing unit 22 performs a process of identifying block data which has not been used, such as a "garbage identification process". For example, the data deletion processing unit 22 counts the number of pointers which is the number that block data (including metadata) stored in the storage device 31 is pointed to from another piece of metadata in an upper layer, and detects block data in which the number of pointers is "0", which means such block data is not pointed at all.

The background task processing unit 23 performs a process of releasing the block data in which the number of pointers is "0" as described above to reclaim the storage region, and background tasks such as defragmentation.

Figure 17:
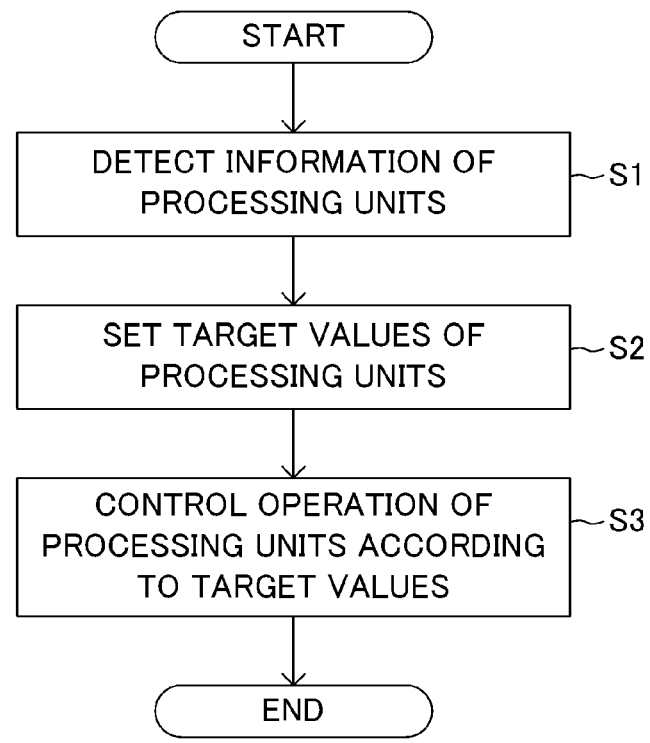
FIG. 17 is a flowchart showing an operation of the storage system of the second exemplary embodiment.

Next, the configurations and operations of the progress status detection unit 24, the target value setting unit 25, and the processing operation controlling unit 26 will be described with reference to the flowchart shown in FIG. 17.

The progress status detection unit 24 detects respective progress statuses of processes performed by the respective processing units such as the data read/write processing unit 21, the data deletion processing unit 22, and the background task processing unit 23 described above (step S1). The progress statuses of the respective processing units 21, 22, and 23 may be throughputs of the respective processing units, for example, which are proportions of the amounts of processing performed by the respective processing units 21, 22, and 23 to the amount of processing performed by the entire storage system 10.

When detecting the progress statuses, the progress status detection unit 24 also detects, from the respective processing units 21, 22, and 23, whether or not there are any tasks waiting to be processed (waiting tasks) in the processing units 21, 22, and 23. Further, the progress status detection unit 24 acquires target values of processing operations, which are set to the respective processing units 21, 22, and 23 by the target value setting unit 25 described below.

As described above, the progress status detection unit 24 acquires, from the respective processing units 21, 22, and 23, the progress statuses which are throughputs, presence or absence of waiting tasks, and the target values set, and provides the target value setting unit 25 with such information. It should be noted that the progress status detection unit 24 may acquire such information including the progress statuses from processing units other than the processing unit 21, 22, and 23, or may detect other items of information.

Then, the target value setting unit 25 sets target values of the processing states of the respective processing units 21, 22, and 23, based on the information provided from the progress status detection unit 24 (step S2). At this moment, setting of the target values is performed based on the respective ideal values preset for the progress statuses of the processing units 21, 22, and 23. As such, the target value setting unit 25 stores the ideal values of the progress statuses of the processing units 21, 22, and 23. For example, the target value setting unit 25 stores throughput values (proportions of the amounts of processing by the respective processing units to the amount of processing by the entire storage system) which are ideal for the respective processing units 21, 22, and 23.

It should be noted that the target values may be the throughputs of the respective processing units, for example, similar to the progress statuses of the processing units. This means that the target values are set as upper limits of values representing the proportions of the amounts of processing by the respective processing units to the amount of processing by the entire system. However, the target values are not limited to the upper limits of the throughputs of the respective processing units, and may be upper limits of the number of tasks which can be performed by the respective processing units.

Specifically, the target value setting unit 25 first focuses on a particular processing unit, and considers the case where the progress status acquired from the particular processing unit does not meet the ideal value set to the particular processing unit and there is no waiting task in the particular processing unit. In this case, as there is no waiting task in the particular processing unit, there is no need to improve the progress status although the current progress status does not meet the ideal value. Accordingly, the value of the current progress status of the particular processing unit is set as a target value of the processing state of the particular processing unit. At this time, the target value of the particular processing state may remain as it is, that is, keep the current state.

If the particular processing unit is operating in a state of not meeting the ideal value as described above, some of the resource to be used by the particular processing unit would be left unused. In that case, the extra resource can be distributed to be used by a processing unit other than the particular processing unit. As such, the target value setting unit 25 sets to increase the target value of the processing state of another processing unit from the current value. In particular, the target value setting unit 25 sets to increase the target value of another processing unit having a waiting task, based on the detected result by the progress status detection unit 24.

At this time, the target value setting unit 25 sets to increase the target value of the other unit if the current progress status of the other unit detected by the progress status detection unit 24 exceeds the target value currently set to the other processing unit. Further, the target value setting unit 25 sets to increase the target value by a value obtained by multiplying the absolute value of the difference between the current progress status detected for the other processing unit and the target value currently set for the other processing unit by a predetermined coefficient (for example, a value of "0.2").

Further, if there are a plurality of other processing units for which the target values should be increases, the target value setting unit 25 may set the target value of the other processing units so as to distribute the extra resource of the particular processing unit according to the proportions of the respective ideal values set to the other processing units. This means that the target value setting unit 25 may increase the target values of the other processing units by the values corresponding to the proportions of the respective ideal values of the other processing units.

Further, the target value setting unit 25 may decrease the target value of a processing unit based on the information acquired from the progress status detection unit 24 as described above. For example, the target value setting unit 25 focuses on a particular processing unit, and considers the case where the progress status acquired from the particular processing unit does not meet the ideal value set for the particular processing unit and there is a waiting task in the particular processing unit. In this case, the progress status of the particular processing unit would not meet the target value because resources are used in other processing units although there is a waiting task in the particular processing unit. Accordingly, in order to improve the current progress status of the particular processing unit, the target value setting unit 25 sets to decrease the target value of another processing unit. Thereby, it is expected that the progress status of the other processing unit is decreased and the resource thereof would be allocated to the particular processing unit.

At this time, the target value setting unit 25 may set to decrease the target value of the other processing unit by a value obtained by multiplying the absolute value of the difference between the current progress status detected for the other processing unit and the target value currently set to the other processing unit by a predetermined coefficient (for example, a value of "0.2").

Then, the processing operation controlling unit 26 controls the processing states of the respective processing units 21, 22, and 23 such that the processing states, that is, the progress statuses, of the processing units 21, 22, and 23 meet the target values set by the target value setting unit 25 (step S3). For example, if the throughput, which is the progress status, of a processing unit is below the target value, the processing operation controlling unit 26 allocates more resources to such processing unit such that the throughput becomes closer to the target value. In contrast, if the throughput, which is the progress status, of a processing unit exceeds the target value, the processing operation controlling unit 26 reduces the resources allocated to such processing unit such that the throughput becomes closer to the target value.

As described above, by setting the processing states, that is, target values of the throughputs which are progress statuses, for example, of the respective processing units while changing them, it is possible to gradually make the progress statuses closer to the ideal values. As such, it is possible to realize ideal processing states while efficiently utilizing the resources of the entire storage system. It is also possible to achieve better system performance by balancing proportions of throughputs among loads.

<Supplementary Notes>

Figure 18:
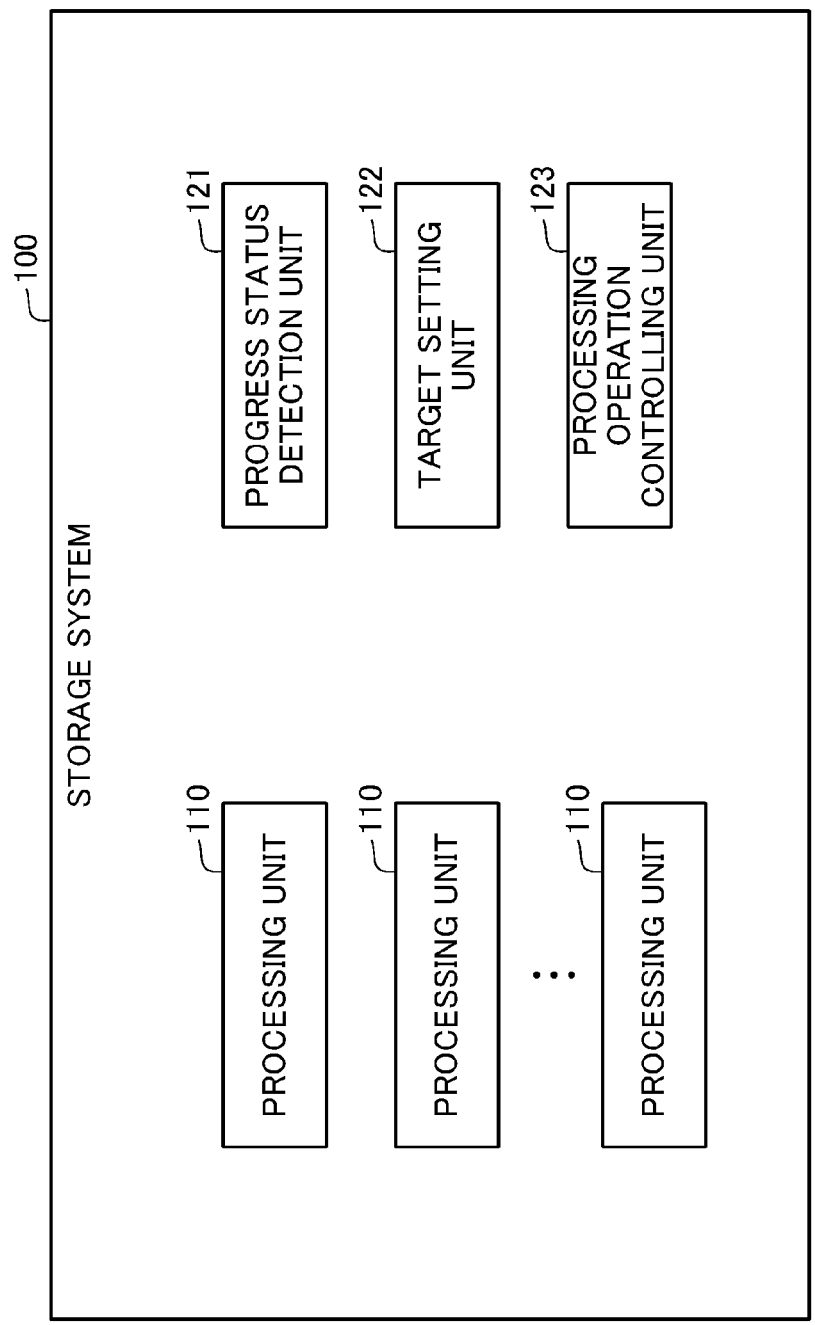
FIG. 18 is a block diagram showing the configuration of a storage system according to Supplementary Note 1.

The whole or part of the exemplary embodiments disclosed above can be described as the following supplementary notes. Outlines of the configurations of a storage system of the present invention (see FIG. 18), a computer-readable medium storing a program, and an information processing method will be described below. However, the present invention is not limited to the configurations described below.

(Supplementary Note 1)

A storage system 100, comprising:

a progress status detection unit 121 that detects respective progress statuses representing proportions of amounts of processing performed by respective processing units 110 to an amount of processing performed by the entire storage system, each of the respective processing units 110 being implemented in the storage system 100 and performing a predetermined task;

a target value setting unit 122 that sets target values of processing states of the respective processing units 110, based on the detected progress statuses of the respective processing units 110 and ideal values of the progress statuses which are preset for the respective processing units 110; and a processing operation controlling unit 123 that controls the processing states of the respective processing units 110 such that the processing states of the respective processing units 110 meet the set target values.

(Supplementary 2)

The storage system, according to supplementary note 1, wherein the progress status detection unit detects whether or not there is a task waiting to be processed in each of the processing units, and if there is no task waiting to be processed in one of the processing units in which the detected progress status does not meet the ideal value, the target value setting unit sets to increase the target value of another one of the processing units in which there is a task waiting to be processed.

(Supplementary Note 3)

The storage system, according to supplementary note 2, wherein the proportions of the amounts of processing performed by the processing units to the amount of processing performed by the entire storage system are used as the target values, and the target value setting unit sets the progress status of the processing unit, in which the detected progress status does not meet the ideal value and there is no task waiting to be processed, as the target value of the processing unit.

(Supplementary Note 4)

The storage system, according to supplementary note 2, wherein the proportions of the amounts of processing performed by the processing units to the amount of processing performed by the entire storage system are used as the target values, and the target value setting unit sets to increase the target value of another one of the processing units in which the detected progress status exceeds the target value.

(Supplementary Note 5)

The storage system, according to supplementary note 2, wherein the proportions of the amounts of processing performed by the processing units to the amount of processing performed by the entire storage system are used as the target values, and the target value setting unit sets to increase the target value by a value based on an absolute value of a difference between the progress status detected in the processing unit for which the target value is to be increased and the target value of the processing unit.

(Supplementary Note 6)

The storage system, according to supplementary note 2, wherein the proportions of the amounts of processing performed by the processing units to the amount of processing performed by the entire storage system are used as the target values, and if there is a task waiting to be processed in one of the processing units in which the detected progress status does not meet the target value, the target value setting unit sets to decrease the target value of another one of the processing units.

(Supplementary Note 7)

The storage system, according to supplementary note 6, wherein the target value setting unit sets to decrease the target value by a value based on an absolute value of a difference between the progress status detected in the processing unit for which the target value is to be decreased and the target value of the processing unit.

(Supplementary Note 8)

A computer program comprising instructions for causing an information processing device to realize, the information processing device including respective processing units that perform predetermined tasks respectively:

a progress status detection unit that detects respective progress statuses representing proportions of amounts of processing performed by the respective processing units to an amount of processing performed by the entire information processing device;

a target value setting unit that sets target values of processing states of the respective processing units, based on the detected progress statuses of the respective processing units and ideal values of the progress statuses which are preset for the respective processing units; and a processing operation controlling unit that controls the processing states of the respective processing units such that the processing states of the respective processing units meet the set target values.

(Supplementary Note 9)

The program, according to supplementary note 8, wherein the progress status detection unit detects whether or not there is a task waiting to be processed in each of the processing units, and if there is no task waiting to be processed in one of the processing units in which the detected progress status does not meet the ideal value, the target value setting unit sets to increase the target value of another one of the processing units in which there is a task waiting to be processed.

(Supplementary Note 10)

An information processing method, comprising:

detecting respective progress statuses representing proportions of amounts of processing performed by respective processing units to an amount of processing performed by an entire storage system, each of the respective processing units being implemented in the storage system and performing a predetermined task;

setting target values of processing states of the respective processing units, based on the detected progress statuses of the respective processing units and ideal values of the progress statuses which are preset for the respective processing units; and controlling the processing states of the respective processing units such that the processing states of the respective processing units meet the set target values.

(Supplementary Note 11)

The information processing method, according to supplementary note 10, wherein the detecting the respective progress statuses includes detecting whether or not there is a task waiting to be processed in each of the processing units, and if there is no task waiting to be processed in one of the processing units in which the detected progress status does not meet the ideal value, setting to increase the target value of another one of the processing units in which there is a task waiting to be processed.

The invention claimed is:

1. A storage system including a processor, comprising:

a value setting unit that sets ideal values for respective processing units each associated with respective load types, the ideal values being predetermined proportions of total throughput of the storage system divided between the load types;

a progress status detection unit performed on the processor that detects respective progress statuses representing proportions of actual amounts of processing performed by respective processing units of the storage system to an amount of processing performed by the entire storage system, each of the respective processing units performing a predetermined task of the respective load types;

a target value setting unit performed on the processor that sets target values of the respective processing units based on the detected progress statuses of the respective processing units and the ideal values for the respective processing units; and a processing operation controlling unit performed on the processor that controls the respective processing units such that the progress statuses of the respective processing units meet the set target values; wherein:

the progress status detection unit detects whether or not there is a task waiting to be processed in each of the processing units, and if there is no task waiting to be processed in one of the processing units of the storage system in which the detected progress status is lower than ideal value, the target value setting unit increases the target value of another one of the processing units in which there is a task waiting to be processed and the progress status is greater than the target value, wherein the target value is increased by a value based on an absolute value of a difference between the progress status and the target value.

2. The storage system, according to claim 1, wherein the proportions of the amounts of processing performed by the processing units to the amount of processing performed by the entire storage system are used as the target values, and the target value setting unit sets the progress status of the processing unit, in which the detected progress status does not meet the ideal value and there is no task waiting to be processed, as the target value of the processing unit.

3. The storage system, according to claim 1, wherein the proportions of the amounts of processing performed by the processing units to the amount of processing performed by the entire storage system are used as the target values, and the target value setting unit sets to increase the target value of another one of the processing units in which the detected progress status exceeds the target value.

4. The storage system, according to claim 1, wherein the proportions of the amounts of processing performed by the processing units to the amount of processing performed by the entire storage system are used as the target values, and the target value setting unit sets to increase the target value by a value based on an absolute value of a difference between the progress status detected in the processing unit for which the target value is to be increased and the target value of the processing unit.

5. The storage system, according to claim 1, wherein the proportions of the amounts of processing performed by the processing units to the amount of processing performed by the entire storage system are used as the target values, and if there is a task waiting to be processed in one of the processing units in which the detected progress status does not meet the target value, the target value setting unit sets to decrease the target value of another one of the processing units.

6. The storage system, according to claim 5, wherein the target value setting unit sets to decrease the target value by a value based on an absolute value of a difference between the progress status detected in the processing unit for which the target value is to be decreased and the target value of the processing unit.

7. A non-transitory computer readable media storing a program comprising instructions, which when executed by a processor, provides the processor with an information processing device including respective processing units to perform predetermined tasks of respective load types respectively, the information processing device comprising:
- a value setting unit that sets ideal values for respective processing units each associated with respective load types, the ideal values being predetermined proportions of total throughput of a storage system divided between the load types;
- a progress status detection unit that detects respective progress statuses representing proportions of actual amounts of processing performed by the respective processing units of the storage system to an amount of processing performed by the entire information processing device;
- a target value setting unit that sets target values of the respective processing units based on the detected progress statuses of the respective processing units and the ideal values for the respective processing units; and
- a processing operation controlling unit that controls the respective processing units such that the progress statuses of the respective processing units meet the set target values, wherein:
  - the progress status detection unit detects whether or not there is a task waiting to be processed in each of the processing units, and
  - if there is no task waiting to be processed in one of the processing units of the storage system in which the detected progress status is lower than the ideal value, the target value setting unit increases the target value of another one of the processing units in which there is a task waiting to be processed and the progress status is greater than the target value, wherein the target value is increased by a value based on an absolute value of a difference between the progress status and the target value.

8. An information processing method, comprising:
- setting ideal values for respective processing units each associated with respective load types, the ideal values being predetermined proportions of total throughput of a storage system divided between the load types;
- detecting respective progress statuses representing proportions actual of amounts of processing performed by respective processing units of the storage system to an amount of processing performed by the entire storage system, each of the respective processing units performing a predetermined task of the respective load types;
- setting target values of the respective processing units based on the detected progress statuses of the respective processing units and the ideal values for the respective processing units; and
- controlling of the respective processing units such that the progress statuses of the respective processing units meet the set target values, wherein the controlling includes:
  - detecting whether or not there is a task waiting to be processed in each of the processing units, and
  - if there is no task waiting to be processed in one of the processing units of the storage system in which the detected progress status is lower than the ideal value, increasing the target value of another one of the processing units in which there is a task waiting to be processed and the progress status is greater than the target value, wherein the target value is increased by a value based on an absolute value of a difference between the progress status and the target value.

* * * * *

UNITED STATES PATENT AND TRADEMARK OFFICE
CERTIFICATE OF CORRECTION

PATENT NO. : 9,182,923 B2
APPLICATION NO. : 13/639344
DATED : November 10, 2015
INVENTOR(S) : Skowron et al.

It is certified that error appears in the above-identified patent and that said Letters Patent is hereby corrected as shown below:

In the Specification

Column 16, Line 65: Delete "30," and insert --31,--

Column 16, Line 66: Delete "2" and insert --22--

Column 17, Line 46: Delete "30." and insert --31.--

Column 18, Line 52: Delete "30" and insert --31--

Column 18, Line 65: Delete "13" and insert --Y13--

Column 22, Line 5: Before "2", insert --Note--

Signed and Sealed this
Twelfth Day of July, 2016

Michelle K. Lee
*Director of the United States Patent and Trademark Office*